United States Patent
Lokhoff et al.

(10) Patent No.: US 7,565,298 B2
(45) Date of Patent: Jul. 21, 2009

(54) RECORD CARRIER HAVING AN ENCODED WIDE-BAND DIGITAL AUDIO SIGNAL RECORDED THEREON

(75) Inventors: Gerardus C. P. Lokhoff, Eindhoven (NL); Yves-Francois Dehery, Cedex (FR); Gerhard Josef Stoll, Munich (DE); Günther Theile, Munich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 302 days.

(21) Appl. No.: 11/007,377

(22) Filed: Dec. 8, 2004

(65) Prior Publication Data

US 2006/0206341 A1    Sep. 14, 2006

Related U.S. Application Data

(60) Division of application No. 10/745,215, filed on Dec. 23, 2003, now Pat. No. 7,209,565, which is a division of application No. 09/908,932, filed on Jul. 19, 2001, now Pat. No. 6,691,086, which is a division of application No. 09/521,052, filed on Mar. 8, 2000, now Pat. No. 6,289,308, which is a division of application No. 08/488,536, filed on Jun. 7, 1995, now abandoned, which is a division of application No. 08/173,850, filed on Dec. 27, 1993, now Pat. No. 5,606,618, which is a continuation of application No. 07/997,158, filed on Dec. 21, 1992, now Pat. No. 5,323,396, which is a continuation of application No. 07/532,462, filed on Jun. 1, 1990, now abandoned.

(30) Foreign Application Priority Data

Jun. 2, 1989   (NL)   .................................... 8901402
Feb. 13, 1990  (NL)   .................................... 9000338

(51) Int. Cl.
     *G11B 20/00*   (2006.01)
(52) U.S. Cl. ..................................................... 704/500
(58) Field of Classification Search ................... 704/500
     See application file for complete search history.

(56) References Cited

U.S. PATENT DOCUMENTS 4,573,034 A    2/1986   Schouhamer
                        Immink ................ 340/347 DD (Continued)

FOREIGN PATENT DOCUMENTS

EP        0150082 A2   7/1985

(Continued)

OTHER PUBLICATIONS

"Nonrecursive Digital Filters for Detecting Multifrequency Code Signals", F.G. Braun, IEEE Transactions on Acoustics, Speech, and Signal Processing, vol. ASSP-23, No. 3, pp. 250-256 (Jun. 1975).

(Continued)

*Primary Examiner*—Susan McFadden

(57) ABSTRACT

Reproduction accuracy of a digital signal, representing, for example, stereo audio signals, is improved by transmitting sample data which have been encoded to form transmission signals. The stereo audio signals are coded into sub(band) signals. Corresponding sub(band) signals of the stereo audio signals may be processed to obtain composite sub(band) signals, which are recorded on a record carrier. To identify whether corresponding sub(band) signals have been processed or not, a mode indicator control signal, indicating whether a corresponding sub signal of the at least two signal components have or have not been processed into a composite sub-signal, is also being recorded on the record carrier.

22 Claims, 11 Drawing Sheets

U.S. PATENT DOCUMENTS

| | | | |
|---|---|---|---|
| 4,620,311 A | 10/1986 | Schouhamer Immink | 375/19 |
| 4,691,292 A | 9/1987 | Rothweiler | 364/724 |
| 4,799,179 A | 1/1989 | Masson et al. | 364/724.1 |
| 4,815,023 A | 3/1989 | Arbeiter | 364/724.01 |
| 4,829,378 A | 5/1989 | LeGall | 358/160 |
| 4,839,750 A | 6/1989 | Kato et al. | 360/48 |
| 4,896,362 A | 1/1990 | Veldhuis et al. | 381/30 |
| 4,918,523 A | 4/1990 | Simon et al. | 358/133 |
| 4,937,686 A | 6/1990 | Arai et al. | 360/32 |
| 5,105,463 A | 4/1992 | Veldhuis et al. | 381/30 |
| 5,440,596 A * | 8/1995 | Kneepkens et al. | 375/240 |
| 6,691,086 B2 * | 2/2004 | Lokhoff et al. | 704/229 |

FOREIGN PATENT DOCUMENTS

| | | |
|---|---|---|
| EP | 0247625 A2 | 12/1987 |
| EP | 0289080 A1 | 11/1988 |
| EP | 0289080 B1 | 11/1988 |
| EP | 0484595 A1 | 5/1992 |
| JP | 61177015 | 8/1986 |
| WO | 8903157 | 4/1989 |

OTHER PUBLICATIONS

"Signalling in Parity—A Brief History", J.P. Chambers, British Broadcasting Corporation Research Department Report, vol. 15 (1985).

"Quadrature Mirror Filter Design for an Arbitrary Number of Equal Bandwidth Channels", P.L. Chu, IEEE Transactions on Acoustics, Speech and Signal Processing, vol. ASSP-33, No. 1, pp. 203-218 (Feb. 1985).

"The Design of Uniformly and Nonuniformly Spaced Pseudoquadrature Mirror Filters", R.V. Cox, IEEE Transactions on Acoustics, Speech and Signal Processing, vol. ASSP-34, No. 5, pp. 1090-1096 (Oct. 1986).

"New Quadrature Mirror Filter Structures", C.R. Garland and H.J. Nussbaumer, IEEE Transactions on Acoustics, Speech and Signal Processing, vol. ASSP-32, No. 3, pp. 522-531 (Jun. 1984).

"On the Relationship Between Digital Rilbert Transformers and Certain Low-Pass Filters", L.B. Jackson, IEEE Transactions on Acoustics, Speech and Signal Processing, vol. ASSP-23, No. 4, pp. 381-383 (Aug. 1975).

"ISO/MPEG Audio Coding", P.Noll and D. Pan, International Journal of High Speed Electronics and Systems, vol. 8, No. 1, pp. 69-118 (1997), reprinted in Signal Compression: Coding of Speech, Audio, Text, Image and Video, N. Jayant ed., Wold Scientific Publishing Co. Pte. Ltd. (1997).

"Pseudo QMF Filter Bank", H.J. Nussbaumer, IBM Technical disclosure Bulletin, vol. 24, No. 6, pp. 3081-3087 (Nov. 1981).

"Computationally Efficient QMF Filter Banks", H.J. Nussbaumer and M. Vetterli, IEEE International Conference on Acoustics, Speech, and Signal Processing, vol. 1, pp. 11.3.1-11.3.4 (1984).

Digital Signal Processing, A.V. Oppenheim and R.W. Schafer, Prentice-Hall International Editions (1975).

"Analysis/Synthesis Filter Bank Design Based on Time Domain Aliasing Cancellation", J.P. Princen and A.B. Bradley, IEEE Transactions on Acoustics, Speech and Signal Processing, vol. ASSP-34, No. 5, pp. 1153-1161 (Oct. 1986).

"Polyphase Quadrature Filters—A New Subband Coding Technique", J.H. Rothweiler, IEEE ICASSP 83, pp. 1280-1283 (Boston 1963).

Recommendation 648, "Digital Recording of Audio Siganls", Question 52/10, Study Programmes 52A/10 and 52B/10 (1986).

* cited by examiner

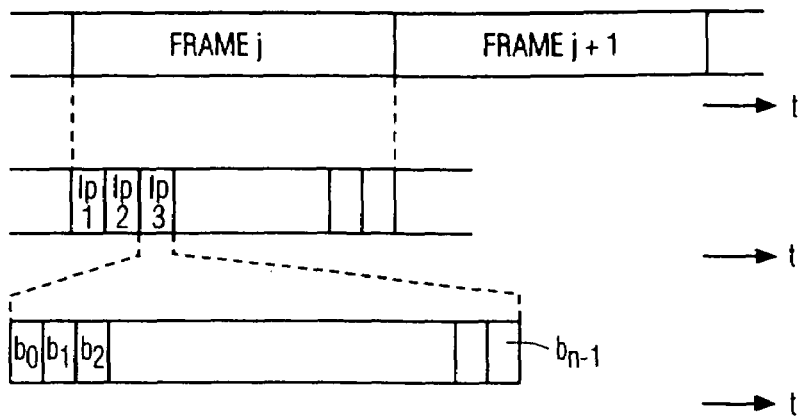
FIG. 1a
FIG. 1b
FIG. 1c
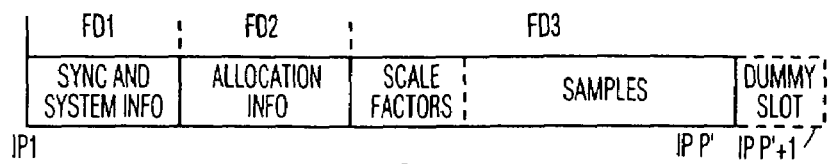
FIG. 2
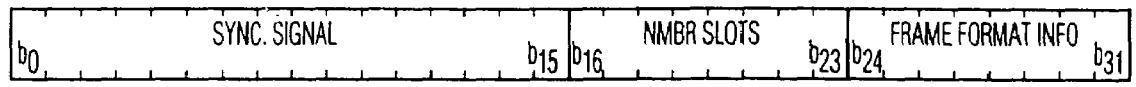
FIG. 3
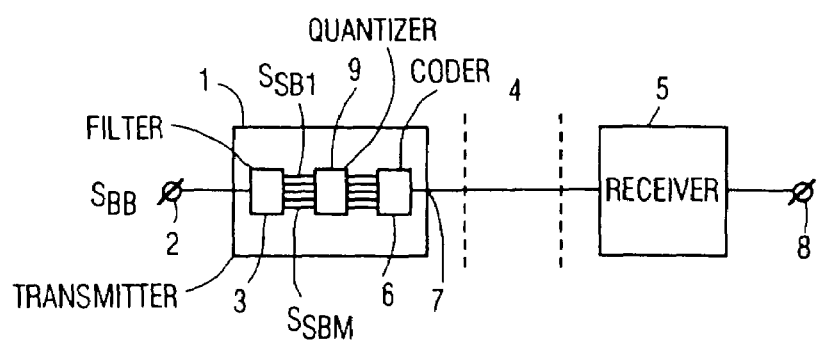
FIG. 4

| BR<br>bitrate<br>(kbits/s) | Fs<br>sample freq.<br>(kHz) | B<br># slots in a frame |
|---|---|---|
| 128 | 32<br>44.1<br>48 | 48<br>34 + padding<br>32 |
| 192 | 32<br>44.1<br>48 | 72<br>52 + padding<br>48 |
| 256 | 32<br>44.1<br>48 | 96<br>69 + padding<br>64 |
| 384 | 32<br>44.1<br>48 | 144<br>104 + padding<br>96 |

FIG. 5

| bitrate<br>(kbits/s) | total # frames in<br>padding sequence | # frames with<br>a dummy slot |
|---|---|---|
| 128 | 147 | 122 |
| 192 | 49 | 12 |
| 256 | 147 | 97 |
| 384 | 49 | 24 |

FIG. 6

Bit 24 :         Frame type      0       format A
                                 1       format B Bits 25 and 26:  Copyright       0 0     no copyright, own rec.
                                 0 1     no copyright, software
                                 1 0     copyright, own recording
                                 1 1     copyright, software
Bits 27 - 31 :   Mode indication

|  |  |  |  |  |  | Sample Freq. | Emphasis |
|---|---|---|---|---|---|---|---|
| 0 | 0 | 0 | 0 | 0 | Stereo | 48 kHz | no emphasis |
| 0 | 0 | 0 | 0 | 1 | Stereo | 48 kHz | 50/15 μsec |
| 0 | 0 | 0 | 1 | 0 | Stereo | 44.1 kHz | no emphasis |
| 0 | 0 | 0 | 1 | 1 | Stereo | 44.1 kHz | 50/15 μsec |
| 0 | 0 | 1 | 0 | 0 | Stereo | 32 kHz | no emphasis |
| 0 | 0 | 1 | 0 | 1 | Stereo | 32 kHz | 50/15 μsec |
| 0 | 0 | 1 | 1 | 0 | reserved |  |  |
| 0 | 0 | 1 | 1 | 1 | reserved |  |  |
| 0 | 1 | 0 | 0 | 0 | 2 Chan. | 48 kHz | no emphasis |
| 0 | 1 | 0 | 0 | 1 | 2 Chan. | 48 kHz | 50/15 μsec |
| 0 | 1 | 0 | 1 | 0 | 2 Chan. | 44.1 kHz | no emphasis |
| 0 | 1 | 0 | 1 | 1 | 2 Chan. | 44.1 kHz | 50/15 μsec |
| 0 | 1 | 1 | 0 | 0 | 2 Chan. | 32 kHz | no emphasis |
| 0 | 1 | 1 | 0 | 1 | 2 Chan. | 32 kHz | 50/15 μsec |
| 0 | 1 | 1 | 1 | 0 | reserved |  |  |
| 0 | 1 | 1 | 1 | 1 | reserved |  |  |
| 1 | 0 | 0 | 0 | 0 | 1 Chan. | 48 kHz | no emphasis |
| 1 | 0 | 0 | 0 | 1 | 1 Chan. | 48 kHz | 50/15 μsec |
| 1 | 0 | 0 | 1 | 0 | 1 Chan. | 44.1 kHz | no emphasis |
| 1 | 0 | 0 | 1 | 1 | 1 Chan. | 44.1 kHz | 50/15 μsec |
| 1 | 0 | 1 | 0 | 0 | 1 Chan. | 32 kHz | no emphasis |
| 1 | 0 | 1 | 0 | 1 | 1 Chan. | 32 kHz | 50/15 μsec |
| 1 | 0 | 1 | 1 | 0 | reserved |  |  |
| 1 | 0 | 1 | 1 | 1 | 1 Chan. | 48 kHz | CCITT J.17 |
| 1 | 1 | 0 | 0 | 0 | Stereo | 48 kHz | CCITT J.17 |
| 1 | 1 | 0 | 0 | 1 | 2 Chan. | 48 kHz | CCITT J.17 |
| 1 | 1 | 0 | 1 | 0 | Stereo | 44.1 kHz | CCITT J.17 |
| 1 | 1 | 0 | 1 | 1 | 2 Chan. | 44.1 kHz | CCITT J.17 |
| 1 | 1 | 1 | 0 | 0 | Stereo | 32 kHz | CCITT J.17 |
| 1 | 1 | 1 | 0 | 1 | 2 Chan. | 32 kHz | CCITT J.17 |
| 1 | 1 | 1 | 1 | 0 | 1 Chan. | 32 kHz | CCITT J.17 |
| 1 | 1 | 1 | 1 | 1 | 1 Chan. | 44.1 kHz | CCITT J.17 |

FIG. 7

| mode | channel I | channel II |
|---|---|---|
| stereo | left | right |
| 2 channel mono | program I | program II |
| 1 channel mono | program I | not used |

FIG. 8

```
allocation      length of samples
info            in bits

0000            -           (no samples or scale factors transferred)
0001            2
0010            3
0011            4
0100            5
0101            6
0110            7
0111            8
1000            9
1001            10
1010            11
1011            12
1100            13
1101            14
1110            15
1111                        not used to prevent incorrect sync detection
```

FIG. 9

```
slot 2:
I-1    II-1    I-2    II-2    I-3    II-3    I-4    II-4
slot 3:
I-5    II-5    I-6    II-6    I-7    II-7    I-8    II-8
slot 4:
I-9    II-9    I-10   II-10   I-11   II-11   I-12   II-12
slot 5:
I-13   II-13   I-14   II-14   I-15   II-15   I-16   II-16
slot 6:
I-17   II-17   I-18   II-18   I-19   II-19   I-20   II-20
slot 7:
I-21   II-21   I-22   II-22   I-23   II-23   I-24   II-24
slot 8:
I-25   II-25   I-26   II-26   I-27   II-27   I-28   II-28
slot 9:
I-29   II-29   I-30   II-30   I-31   II-31   I-32   II-32
```

FIG. 10

```
slot 2:
I-1    II-1    I-2    II-2    I-3    II-3    I-4    II-4
slot 3:
I-5    II-5    I-6    II-6    I-7    II-7    I-8    II-8
slot 4:
I-9    II-9    I-10   II-10   I-11   II-11   I-12   II-12
slot 5:
I-13   II-13   I-14   II-14   I-15   II-15   I-16   II-16
```

FIG. 11

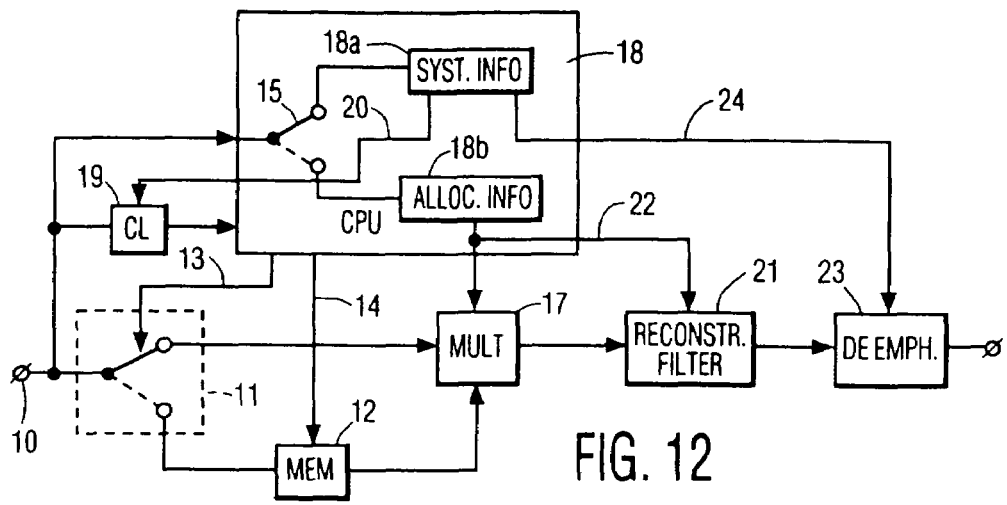
FIG. 12
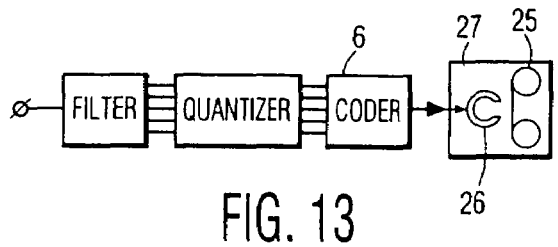
FIG. 13
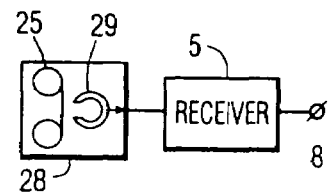
FIG. 14
FIG. 15a
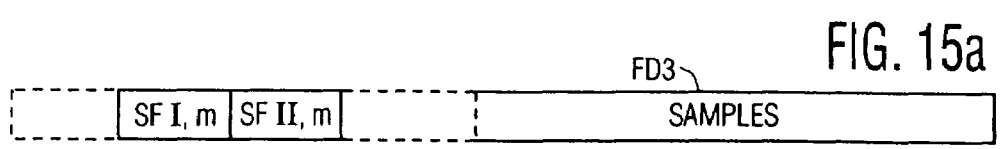
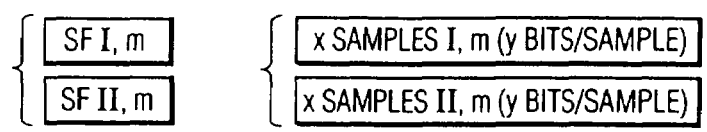
FIG. 15b
FIG. 15c
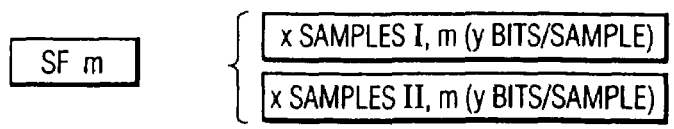
FIG. 15d Bits 16 to 19 : bitrate index

| BR bitrate (kbits/sec.) | BR index | sample frequency Fs | | |
|---|---|---|---|---|
| | | 48 kHz # slots | 44.1 kHz # slots | 32 kHz # slots |
| 32 | 1 | 8 | 8 | 12 |
| 64 | 2 | 16 | 17 | 24 |
| 96 | 3 | 24 | 26 | 36 |
| 128 | 4 | 32 | 34 | 48 |
| 160 | 5 | 40 | 43 | 60 |
| 192 | 6 | 48 | 52 | 72 |
| 224 | 7 | 56 | 60 | 84 |
| 256 | 8 | 64 | 69 | 96 |
| 288 | 9 | 72 | 78 | 108 |
| 320 | 10 | 80 | 87 | 120 |
| 352 | 11 | 88 | 95 | 132 |
| 384 | 12 | 96 | 104 | 144 |
| 416 | 13 | 104 | 113 | 156 |
| 448 | 14 | 112 | 121 | 168 |
| | | | + padding | |

Bits 20 and 21 : Sample Frequency

```
            0 0      44.1 kHz
            0 1      48   kHz
            1 0      32   kHz
            1 1      reserved
```

Bit 22 : padding bit

'1' if the frame contains a 'dummy' slot, Otherwise '0'

Bit 23 : Future Use      reserved for future use, '0' for the time being.

FIG.19

Bits 24 and 25 : Mode indication 0 0    stereo
    0 1    intensity stereo
    1 0    bilingual
    1 1    mono Bits 26 and 27 : Intensity stereo mode switches :

0 0    subbands 5 - 32 in intensity stereo mode
    0 1    subbands 9 - 32 in intensity stereo mode
    1 0    subbands 13 - 32 in intensity stereo mode
    1 1    subbands 17 - 32 in intensity stereo mode Bit 28 : Copyright    0    no copyright
                      1    copyright protected Bit 29 : Original/Home Copy    0    Copy
                                 1    Original Bits 30 and 31 : Emphasis    0 0    no emphasis
                              0 1    50/15 µsec emphasis
                              1 0    reserved
                              1 1    CCITT J.17

FIG.20

Mono mode :

M = mono signal slot 2:
    M-1  M-2  M-3  M-4  M-5  M-6  M-7  M-8
slot 3:
    M-9  M-10  M-11  M-12  M-13  M-14  M-15  M-16
slot 4:
    M-17  M-18  M-19  M-20  M-21  M-22  M-23  M-24
slot 5:
    M-25  M-26  M-27  M-28  M-29  M-30  M-31  M-32

FIG.21

```
Intensity Stereo mode :

L = left channel, R = right channel, M = mono signal

Switch bits (bits 26 and 27) are 0 0 :

slot 2:
      L-1   R-1   L-2   R-2   L-3   R-3   L-4   R-4
slot 3:
      M-5   M-6   M-7   M-8   M-9   M-10  M-11  M-12
slot 4:
      M-13  M-14  M-15  M-16  M-17  M-18  M-19  M-20
slot 5:
      M-21  M-22  M-23  M-24  M-25  M-26  M-27  M-28
slot 6:
      M-29  M-30  M-31  M-32
```

FIG. 22a

```
Switch bits are 0 1 :

slot 2:
      L-1   R-1   L-2   R-2   L-3   R-3   L-4   R-4
slot 3:
      L-5   R-5   L-6   R-6   L-7   R-7   L-8   R-8
slot 4:
      M-9   M-10  M-11  M-12  M-13  M-14  M-15  M-16
slot 5:
      M-17  M-18  M-19  M-20  M-21  M-22  M-23  M-24
slot 6:
      M-25  M-26  M-27  M-28  M-29  M-30  M-31  M-32
```

FIG. 22b

```
Switch bits are 1 0 :

slot 2:
      L-1   R-1   L-2   R-2   L-3   R-3   L-4   R-4
slot 3:
      L-5   R-5   L-6   R-6   L-7   R-7   L-8   R-8
slot 4:
      L-9   R-9   L-10  R-10  L-11  R-11  L-12  R-12
slot 5:
      M-13  M-14  M-15  M-16  M-17  M-18  M-19  M-20
slot 6:
      M-21  M-22  M-23  M-24  M-25  M-26  M-27  M-28
slot 7:
      M-29  M-30  M-31  M-32
```

FIG. 22c

```
Switch bits are 1 1 :

slot 2:
      L-1   R-1   L-2   R-2   L-3   R-3   L-4   R-4
slot 3:
      L-5   R-5   L-6   R-6   L-7   R-7   L-8   R-8
slot 4:
      L-9   R-9   L-10  R-10  L-11  R-11  L-12  R-12
slot 5:
      L-13  R-13  L-14  R-14  L-15  R-15  L-16  R-16
slot 6:
      M-17  M-18  M-19  M-20  M-21  M-22  M-23  M-24
slot 7:
      M-25  M-26  M-27  M-28  M-29  M-30  M-31  M-32
```

FIG. 22d

RECORD CARRIER HAVING AN ENCODED WIDE-BAND DIGITAL AUDIO SIGNAL RECORDED THEREON

CROSS-REFERENCE TO RELATED APPLICATIONS

This application is a division of U.S. patent application Ser. No. 10/745,215, filed Dec. 23, 2003, now U.S. Pat. No. 7,209,565 which is a division of U.S. patent application Ser. No. 09/908,932, filed Jul. 19, 2001, now U.S. Pat. No. 6,691,086, which was a division of U.S. patent application Ser. No. 09/521,052, filed Mar. 8, 2000, now U.S. Pat. No. 6,289,308, which was a division of U.S. patent application Ser. No. 08/488,536, filed Jun. 7, 1995 (now abandoned), which was a division of U.S. patent application Ser. No. 08/173,850, filed Dec. 27, 1993, now U.S. Pat. No. 5,606,618, which was a continuation of U.S. patent application Ser. No. 07/997,158, filed Dec. 21, 1992, now U.S. Pat. No. 5,323,396, which was a continuation of U.S. patent application Ser. No. 07/532,462, filed Jun. 1, 1990 (now abandoned).

BACKGROUND OF THE INVENTION

1. Field of the Invention

The invention relates to a record carrier having an encoded wide-band digital audio signal recorded thereon, the wide-band digital audio signal comprising at least a first and a second signal component, the signal components being filtered into sub-signals for the at least two signal components, a sub-signal comprising sample information.

2. Description of the Related Art

A record carrier as defined in the opening paragraph can be used in transmission systems such as, e.g., known from the article "The Critical Band Coder—Digital Encoding of Speech signals based on the Perceptual requirements of the Auditory System" by M. E. Krasner in Proc. IEEE ICASSP 80, Vol. 1, pp. 327-331, Apr. 9-11, 1980. This article relates to a transmission system in which the transmitter (recording device) employs a sub-band coding system and the receiver (reproducing device) employs a corresponding sub-band decoding system. However, the invention is not limited to such a coding system, as will become apparent hereinafter.

In the system known from this publication, the speech signal band is divided into a plurality of sub-bands having bandwidths approximately corresponding to the bandwidths of the critical bands of the human ear in the respective frequency ranges (cf. FIG. 2 in the above Krasner article). This division has been selected because, on the basis of psycho-acoustic experiments, it is foreseeable that the quantization noise in such a sub-band will be masked to an optimum extent by the signals in this sub-band if, in the quantization, allowance is made for the noise-masking curve of the human ear (this curve giving the threshold value for noise masking in a critical band by a single tone in the center of the critical band, cf. FIG. 3 in the above Krasner article).

It should, however, be noted that the invention is not restricted to an encoding into sub-band signals. It is equally well possible to apply transform coding in the encoder, a transform coding being described in the publication "Low bit-rate coding of high-quality audio signals. An introduction to the MASCAM system" by G. Theile et al., in EBU Technical Review, No. 230 (August 1988).

In the case of a high-quality digital music signal, which, in conformity with the Compact Disc Standard, is represented by 16 bits per signal sample in the case of a sample frequency of 1/T=44.1 kHz, it is found that with a suitably selected bandwidth and a suitably selected quantization for the respective sub-bands, the use of this known sub-band coding system yields quantized output signals of the coder which can be represented by an average number of approximately 2.5 bits per signal sample, the quality of the replica of the music signal not differing perceptibly from that of the original music signal in substantially all passages of substantially all kinds of music signals.

The sub-bands need not necessarily correspond to the bandwidths of the critical bands of the human ear. Alternatively, the sub-bands may have other bandwidths, for example, they may all have the same bandwidth, provided that allowance is made for this in determining the masking threshold.

The known record carrier has the disadvantage that, in some cases, perceptible differences occur in the signal reproduced, such perceptible differences being in the form of a distortion component present in the signal reproduced from the record carrier.

SUMMARY OF THE INVENTION

It is an object of the invention to provide measures to enable the transmission of the wide-band digital signal via a record carrier so as to realize a significant reduction of the distortion component present in the signal reproduced from the record carrier.

This object is achieved by the record carrier described above, characterized in that a composite sub-signal may have been derived from at least one corresponding sub-signal of the at least first and second signal components, the record carrier having recorded thereon sub-signals of the at least two signal components that have not been processed into a composite sub-signal, and a mode indicator control signal ($b_{24}$, $b_{25}$), indicating whether a corresponding sub-signal of the at least two signal components have or have not been processed into a composite sub-signal, also being recorded on the record carrier.

The invention is based on the recognition that the distortion arises because of the fact that sometimes the specific number of bits being available for the quantization of the wide-band digital signal in the recording device is too low. As a result, a number of bits is allocated to a sub(band) signal which is too low. This results in a quantization of a sub-signal which is too rough, leading to audible distortion upon reproduction and after decoding. By processing corresponding sub-signals (sub-band signals) into a composite signal, it suffices to quantize only one composite sub(band) signal instead of the two corresponding sub(band) signals. This results in less bits being required in the quantization step for the quantization of the sub(band) signal. As an alternative, it offers the composite signal to be quantized with a relatively larger number of bits than if the two sub(band) signals would have been quantized separately.

It is a further object of the invention to provide a number of steps for the transmission system, in particular, a very specific choice for the format with which the digital wide-band signal, after conversion into the second digital signal, can be transmitted via the transmission medium, in such a way that a flexible and highly versatile transmission system is obtained. This is to be understood to mean that the transmitter should be capable of converting wide-band digital signals of different formats (these formats differing, inter alia, with respect to the sample frequency $F_S$ of the wide-band digital signal, which may have different values, such as, 32 kHz, 44.1 kHz and 48 kHz, as laid down in the digital audio interface standard of the AES and the EBU) into the second digital signal. Similarly, the receiver should be capable of deriving a wide-band signal of the correct format from said second digital signal. To this end, the transmission system in accordance with the invention is characterized in that if P in the formula $$P = BR \times n_S / N \times F_S$$

is an integer, where BR is the bit rate of the second digital signal, and $n_S$ is the number of samples of the wide-band digital signal whose corresponding information, which belongs to the second digital signal, is included in one frame of the second digital signal, the number of information packets B in one frame is P, and in that, if P is not an integer, the number of information packets in a number of the frames is P', P' being the next lower integer following P, and the number of information packets in the other frames is equal to P'+1 so as to exactly comply with the requirement that the average frame rate of the second digital signal should be substantially equal to $F_S/n_S$, and that a frame should comprise at least a first frame portion including the synchronizing information. The purpose of dividing the frames into B information packets is that, for a wide-band digital signal of an arbitrary sample frequency $F_S$, the average frame rate of the second digital signal transmitted by the transmitter is now such that the duration of a frame in the second digital signal corresponds to the duration occupied by $n_S$ samples of the wide-band signal. Moreover, this enables the synchronization to be maintained on an information-packet basis, which is simpler and more reliable than maintaining the synchronization on a bit basis. Thus, in those cases where P is not an integer, the transmitter is capable, at instants at which this possible and also necessary, of providing a frame with P'+1 instead of P' information blocks, so that the average frame rate of the second digital signal can be maintained equal to $F_S/n_S$. Since, in this case, the spacing between the synchronizing information (synchronizing signals or synchronizing words) included in the first frame portion of succeeding frames is also an integral multiple of the length of an information packet, it remains possible to maintain the synchronization on an information packet basis. Preferably, the first frame portion further contains information related to the number of information packets in a frame. In a frame comprising B information packets, this information may be equal to the value B. This means that this information corresponds to P' for frames comprising P' information packets, and to P'+1 for frames comprising P'+1 information packets. Another possibility is that this information corresponds to P' for all frames, regardless of whether a frame comprises P' or P'+1 information packets. The additionally inserted (P'+1)th information packet may comprise, for example, merely "zeros". In that case, this information packet does not contain any useful information. Of course, the additional information packet may also be filled with useful information. The first frame portion may further comprise system information. This may include the sample frequency $F_S$ of the wide-band digital signal applied to the transmitter, copy-protection codes, the type of wide-band digital signal applied to the transmitter, such as a stereo-audio signal or a mono-audio signal, or a digital signal comprising two substantially independent audio signals. However, other system information is also possible, as will become apparent hereinafter. Including the system information makes it possible for the receiver to be also flexible and enables the received second digital signal to be correctly reconverted into the wideband digital signal. The second and the third frame portions of a frame contain signal information. The transmitter may comprise a coder comprising signal-splitting means responsive to the wide-band digital signal for generating a second digital signal in the form of a number of M sub-signals, M being larger than 1, and comprising means for quantizing the respective sub-signals. For this purpose, an arbitrary transform coding, such as the fast Fourier transform (FFT), may be used. In that case, the transmission system is characterized in that the second frame portion of a frame contains allocation information which, for at least a number of sub-signals, indicates the number of bits representing the samples of the quantized sub-signals derived from said sub-signals, and in that the third frame portion contains the samples of at least said quantized sub-signals (if present). At the receiving end, it is then necessary to apply an inverse transform coding, for example, an inverse Fourier transform (1FFT), to recover the wide-band digital signal. The transmission system, in which the signal-splitting means takes the form of analysis-filter means responsive to the wide-band digital signal for generating a number of M sub-band signals, this analysis-filter means dividing the signal band of the wide-band digital signal, using a sample-frequency reduction, into successive sub-bands having band numbers m increasing with the frequency, and in which the quantization means is adapted to quantize the respective sub-band signals block by block, is a system employing sub-band coding as described above. Such a transmission system is characterized further in that, for at least a number of the sub-band signals, the allocation information in the second frame portion of a frame specifies the number of bits representing the samples of the quantized sub-band signals derived from said sub-band signals, and in that the third frame portion contains the samples of at least said quantized sub-band signals (if present). This means, in fact, that the allocation information is inserted in a frame before the samples. This allocation information is needed to enable the continuous serial bit stream of the samples in the third frame portion to be subdivided into the various individual samples of the correct number of bits at the receiving end. The allocation information may require that all samples are represented by a fixed number of bits per sub-band per frame. This is referred to as a transmitter based on fixed or static bit allocation. The allocation information may also imply that a number of bits variable in time is used for the samples in a sub-band. This is referred to as a transmitter based on the system of adaptive or dynamic bit allocation. Fixed and adaptive bit allocation are described, inter alia, in the publication "Low bit-rate coding of high quality audio signals. An introduction to the MASCAM system" by G. Theile et al., EBU Technical Review, No. 230 (August 1988). Inserting the allocation information in a frame before the samples in a frame, has the advantage that, at the receiving end, a simpler decoding becomes possible, which can be carried out in real time and which produces only a slight signal delay. As a result of this sequence, it is no longer necessary to first store all the information in the third frame portion in a memory in the receiver. Upon arrival of the second digital signal, the allocation information is stored in a memory in the receiver. Information content of the allocation information is much smaller than the information content of the samples in the third frame portion, so that a substantially smaller store capacity is needed than in the case that all the samples would have to be stored in the receiver. Immediately upon arrival of the serial data stream of the samples in the third frame portion, this data stream can be divided into the various samples having the number of bits specified by the allocation information, so that no previous storage of the signal information is necessary. The allocation information for all the sub-bands can be included in a frame. However, this is not necessary, as will become apparent hereinafter.

The transmission system may be characterized further in that, in addition, the third frame portion includes information relating to scale factors, a scale factor being associated with at least one of the quantized sub-band signals contained in the third frame portion, and in that the scale factor information is included in the third frame portion before the quantized sub-band signals. The samples can be coded in the transmitter without being normalized, i.e., without the amplitudes of a block of samples in a sub-band having been divided by the amplitude of the sample having the largest amplitude in this block. In that case, no scale factors have to be transmitted. If the samples are normalized during coding, scale factor information has to be transmitted to provide a measure of said largest amplitude. If, in this case, the scale factor information is also inserted in the third frame portion before the samples, it is possible that during reception, the scale factors to be derived from said scale information are first stored in a memory and the samples are multiplied immediately upon arrival, i.e., without a time delay, by the inverse values of said scale factors. The scale factor information may be constituted by the scale factors themselves. It is obvious that a scale factor, as inserted in the third frame portion, may also be the inverse of the amplitude of the largest sample in a block, so that in the receiver, it is not necessary to determine the inverse value and, consequently, decoding can be faster. Alternatively, the values of the scale factors may be encoded prior to insertion in the third frame portion as scale factor information and subsequent transmission. Moreover, it is evident that if, after quantization in the transmitter, the sub-band signal in a sub-band is zero, which obviously will be apparent from the allocation information for the sub-band, no scale factor information for this sub-band has to be transmitted. The transmission system, in which the receiver comprises a decoder comprising synthesis filter means responsive to the respective quantized sub-band signals for constructing a replica of the wide-band digital signal, this synthesis filter means combining the sub-bands applying sample-frequency increase to form the signal band of the wide-band digital signal, may be characterized in that the samples of the sub-band signals (if present) are inserted in the third frame portion in a sequence corresponding to the sequence in which said samples are applied to the synthesis filter means upon reception in the receiver. Inserting the samples in the third frame portion in the same sequence as that in which they are applied to the synthesis filter means in the receiver, also results in fast decoding, which again does not require additional storage of the samples in the receiver before they can be further processed. Consequently, the storage capacity required in the receiver can be limited substantially to the storage capacity needed for the storage of the system information, the allocation information and, if applicable, the scale factor information. Moreover, a limited signal delay is produced, which is mainly the result of the signal processing performed upon the samples. The allocation information for the various quantized sub-band signals is suitably inserted in the second frame portion in the same sequence as that in which the samples of the sub-band signals are included in the third frame portion. The same applies to the sequence of the scale factors. If desired, the frames may also be divided into four portions, the first, the second and the third frame portions being as described hereinbefore. The last (fourth) frame portion in the frame may then contain error-detection and/or error-correction information. Upon reception of this information in the receiver, it is possible to apply a correction for errors produced in the second digital signal during transmission. As already stated, the wide-band digital signal may be a monophonic signal. Alternatively, the wide-band digital signal may be a stereo audio signal made up of a first (left) channel component and a second (right) channel component. If the transmission system is based on a sub-band coding system, the transmitter will supply sub-band signals each comprising a first and a second sub-band signal component, which, after quantization in the quantization means, are converted to form first and second quantized sub-band signal components. In this case, the frames should also include allocation information and scale-factor information (if the samples have been scaled in the transmitter). The sequence is also important here. It is obvious that the system can be extended to handle a wide-band digital signal comprising more than two signal components.

The inventive steps may be applied to digital transmission systems, for example, systems for the transmission of digital audio signals (digital audio broadcast) via the ether. However, other uses are also conceivable. An example of this is a transmission via optical or magnetic media. Optical-media transmissions may be, for example, transmissions via glass fibers or by means of optical discs or tapes. Magnetic-media transmissions are possible, for example, by means of a magnetic disc or a magnetic tape. The second digital signal is then stored in the format as proposed by the invention in one or more tracks of a record carrier, such as an optical or magnetic disc or a magnetic tape. The versatility and flexibility of the transmission system thus resides in the special format with which the information in the form of the second digital signal is transmitted, for example, via a record carrier. This is combined with the special construction of the transmitter which is capable of generating this special format for various types of input signals. The transmitter generates the system information required for every type of signal and inserts this information in the data stream to be transmitted. At the receiving end, this is achieved by means of a specific receiver which extracts said system information from the data stream and employs it for a correct decoding. The information packets then constitute a kind of fictitious units, which are used to define the length of a frame. This means that they need not be explicitly discernible in the information stream of the second digital signal. Moreover, the relationship of the information packets with the existing digital audio interface standard is as defined in the IEC Standard No. 958. This standard, as normally applied to consumer products, defines frames containing one sample of both the left-hand and the right-hand channels of a stereo signal. These samples are represented by means of 16-bit two's complement words. If $N=32$ is selected, one frame of this digital audio interface standard can transmit exactly one information packet of the second digital signal. In the digital audio interface standard, the frame rate is equal to the sample rate. For the present purpose, the frame rate should be selected to be equal to BR/N. This enables the present IC's employed in standard digital audio interface equipment to be used.

BRIEF DESCRIPTION OF THE DRAWINGS

With the above and additional objects and advantages in mind as will hereinafter appear, the invention will be described with reference to the accompanying drawings, in which:

FIGS. 1a-1c show a diagram of a digital signal according to the invention, generated by an encoder and made up of frames each composed of information packets;

FIG. 2 is a diagram of the structure of a frame according to a preferred embodiment including scale factors;

FIG. 3 is a diagram of the structure of the first portion of the frame of FIG. 2;

FIG. 4 is a block diagram of a digital transmission system for producing and using a signal according to the invention, comprising a transmitter having an encoder and a receiver having a decoder;

FIG. 5 is a table showing the number of information packets B in a frame, for certain values of bit rate BR and sample frequency $F_S$;

FIG. 6 is a table showing the numbers of frames in a padding sequence, and the number of frames in that sequence having an additional information packet (a dummy slot) for different bit rates;

FIG. 7 is a table showing the system information included in the first portion of a frame;

FIG. 8 is a table showing a distribution of information between two channels for different modes;

FIG. 9 is a table of meanings of allocation information inserted in the second portion of a frame;

FIGS. 10 and 11 are tables showing sequences in which allocation information is stored for two different formats;

FIG. 12 is a block diagram of a receiver including a decoder for decoding signals according to the invention;

FIG. 13 is a simplified block diagram of an encoder for recording a signal on a magnetic record carrier according to the invention;

FIG. 14 is a simplified block diagram of a receiver for producing a replica signal corresponding to a transmission signal in a magnetic record carrier according to the invention;

FIGS. 15a-15d are diagrams of different arrangements of scale factors and samples in the third portion of a frame of a transmission signal;

FIG. 19 is a diagram of a structure for a portion of the structure of FIG. 17, where the signal is an audio signal;

FIG. 20 is a table showing bit codings in an embodiment of the structure of FIG. 19 for stereo signals;

FIG. 21 is a table showing a sequence for allocation information accommodated in a second frame portion associated with the first portion of FIG. 17;

FIGS. 22a-22d are tables showing sequences for allocation information accommodated in a second frame portion associated with the first portion of FIG. 17, for a stereo intensity mode;

DESCRIPTION OF THE PREFERRED EMBODIMENTS

Figure 16:
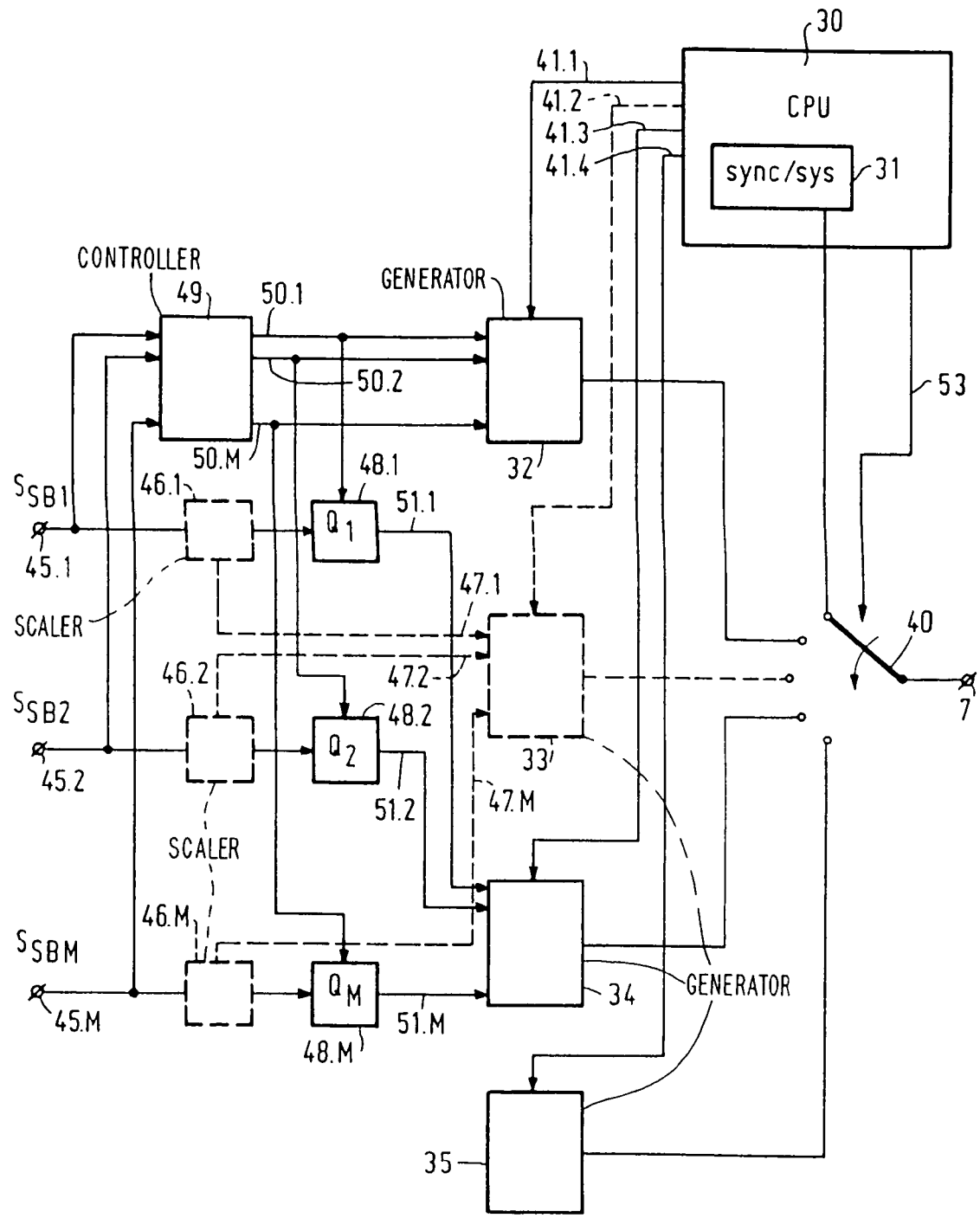
FIG. 16 is a block diagram of a sub-band coding transmitter arrangement.

FIG. 1 shows, diagrammatically, the transmission signal as generated by the transmitter and transmitted through a transmission medium (real time or via recording). The transmission signal is in the form of a serial digital data stream. The transmission signal comprises frames, two such frames, i.e., the frame j and the frame j+1, being shown in FIG. 1a. The frames, such as the frame j, comprise a plurality of information packets IP1, IP2, IP3, . . . , such as shown in FIG. 1b. Each information packet, such as IP3, is composed of N bits $b_o$, $b_1$, $b_2$, . . . , $b_{N-1}$, such as shown in FIG. 1c.

Number of Packets

The number of information packets in a frame depends upon:

(a) the bit rate BR with which the transmission signal is transmitted through the transmission medium, (b) the number of bits N in an information packet, N being larger than 1, (c) the sample frequency $F_S$ of the wide-band digital signal, and (d) the number of samples $n_S$ of the wide-band digital signal.

The information which corresponds to these packets, and which after conversion in the transmitter is in the transmission signal, is included in one frame in the following manner.

The parameter P is computed in conformity with the formula:

$$P=(BR \times n_S)/(N \times F_S).$$

If this computation yields an integer for P, the number of information packets B in a frame will be equal to P. If the computation does not result in an integer, some frames will comprise P' information packets and the other frames will comprise P'+1 information packets. P' is the next lower integer following P. The number of frames comprising P' and P'+1 information packets is selected in such a way that the average frame rate is equal to $F_S/n_S$.

Hereinafter, it is assumed that N=32 and $n_S$=384. The table in FIG. 5 gives the number of information packets (slots) in one frame for these values for N and $n_S$, and for four values of the bit rate BR and three values for the sample frequency $F_S$. It is evident that for a sample frequency $F_S$ equal to 44.1 kHz, the parameter P is not an integer in all cases and that, consequently, a number of frames comprise 34 information packets and the other frames comprise 35 information packets (when BR is 128 kbit/s). This is also illustrated in FIG. 2.

FIG. 2 shows one frame. The frame is composed of P' information packets IP1, IP2, . . . , IP P'. Sometimes the frame is composed of P'+1 information packets. This is achieved by assigning an additional information packet (dummy slot) to the frames of P' information packets. The second column of the table of FIG. 6 gives the number of frames in the padding sequence for a sample frequency of 44.1 kHz and the aforementioned four bit rates. The third column specifies those frames of that number of frames in the sequence which comprise P'+1 information packets. By subtracting the numbers in the second and the third columns from each other, this yields the number of frames in the sequence comprising P' information packets. The (P'+1)th information packet need not contain any information, and may then be composed, for example, only of zeroes.

It is obvious that the bit rate BR is not necessarily limited to the four values as given in the tables of FIGS. 5 and 6. Other (for example, intermediate) values are also possible.

FIG. 2 shows that a frame comprises three frame portions FD1, FD2 and FD3 in this order. The first frame portion FD1 contains synchronizing information and system information. The second frame portion FD2 contains allocation information. The third frame portion FD3 contains samples and, when applicable, scale factors of the transmission signal. For a further explanation, it is necessary to first describe the operation of the encoder included in a transmitter in a transmission system.

Transmission System

FIG. 4 shows, diagrammatically, a transmission system comprising a transmitter 1 having an input terminal 2 for receiving a wide-band digital signal $S_{BB}$, which may be a digital audio signal, for example. In the case of an audio signal, this may be a mono signal or a stereo signal, in which case the digital signal comprises a first (left channel) and a second (right channel) signal component. In this embodiment, the transmitter comprises a coder for sub-band coding of the wide-band digital signal and the receiver consequently comprises a sub-band decoder for recovering the wide-band digital signal.

The transmitter comprises an analysis filter 3 responsive to the digital wide-band signal $S_{BB}$ for dividing the wide-band signal into a plurality M of successive frequency sub-bands having band numbers m, where $1 \leq m \leq M$, which increase with frequency. All of these sub-bands may have the same bandwidth but, alternatively, the sub-bands may have different bandwidths. In that case, the sub-bands may correspond, for example, to the bandwidths of the critical bands of the human ear. The analysis filter 3 generates sub-band signals $S_{SB1}$ to $S_{SBM}$, for the respective sub-bands. The transmitter further comprises circuits for sample-frequency reduction and block-by-block quantization of the respective sub-band signals, shown as the block 9 in FIG. 4.

Such a sub-band coder is known and is described, for example, in the aforementioned publications by Krasner and by Theile et al. For a further description of the operation of the sub-band coder, reference is made to these publications, and also to the published European Patent Application EPA 289, 080, corresponding to U.S. Pat. No. 4,896,362, which are therefore incorporated herein by reference. Such a sub-band coder enables a significant data reduction to be achieved in the signal which is transmitted to the receiver 5 through the transmission medium 4, for example, a reduction from 16 bits per sample for the wide-band digital signal $S_{BB}$ to 4 bits per sample if $n_S$ is 384. This means that there are blocks of 384 samples of the wide-band digital signal, each sample having a length of 16 bits. If a value M=32 is assumed, the wide-band digital signal is split into 32 sub-band signals in the analysis filter 3. Now, 32 (blocks of) sub-band signals appear on the 32 outputs of the analysis filter 3, each block comprising 12 samples (the sub-bands have equal width) and each sample having a length of 16 bits. This means that at the outputs of the filter 3, the information content is still equal to the information content of the block of 384 samples of the signal $S_{BB}$ at the input 2.

The data reduction circuit 9 operates on the output of the filter 3 using the knowledge about masking. At least some of the samples in the 32 blocks of 12 samples, each block for one sub-band, are quantized more roughly and can thus be represented by a smaller number of bits. In the case of static bit allocation, all the samples per sub-band per frame are expressed in a fixed number of bits. This number can be different for two or more sub-bands but it can also be equal for the sub-bands, for example, equal to 4 bits. In the case of dynamic bit allocation, the number of bits selected for every sub-band may differ viewed in time, so that sometimes even a larger data reduction can be achieved, or a higher quality can be achieved with the same bit rate.

The sub-band signals quantized in the block 9 are applied to a generator unit 6. Starting from the quantized sub-band signals, this unit 6 generates the transmission signal as illustrated in FIGS. 1 and 2. This transmission signal, as stated hereinbefore, can be transmitted directly through the medium 4. Preferably, however, this transmission signal is first adapted in a signal converter (not shown), such as an 8-to-10 converter. Such an 8-to-10 converter is described in, for example, European Patent Application EPA 150,082, corresponding to U.S. Pat. No. 4,620,311. This converter converts 8-bit data words into 10-bit data words, and enables an interleaving process to be applied. The purpose behind these processes is to enable error correction to be performed on the information received at the receiving side. De-interleaving, error correction and 10-to-8 conversion are then performed in the receiver.

Frame Format

The composition and content of the frames will now be explained in more detail. The first frame portion FD1 in FIG. 2 is shown in greater detail in FIG. 3. FIG. 3 shows that the first frame portion consists of exactly 32 bits and is, therefore, exactly equal to one information packet, namely, the first information packet IP1 of the frame. The first 16 bits of the information packet form the synchronizing signal (or synchronizing word), and may comprise, for example, only "ones". The bits 16 to 31 are system information. The bits 16 to 23 represent the number of information packets in a frame. This number consequently corresponds to P', both for the frame comprising P' information packets and for frames comprising the additional information packet IP P'+1. P' can be, at most, 254 (1111 1110 in bit notation) in order to avoid resemblance to the synchronizing signal. The bits 24 to 31 provide frame format information.

FIG. 7 gives an example of the arrangement and significance of this frame format information. Bit 24 indicates the type of frame. In the case of format A, the second frame portion has another length (a different number of information packets) than in the case of format B. As will become apparent hereinafter, the second frame portion FD2 in the A format comprises 8 information packets, namely, the information packets IP2 to IP9 inclusive; and in the B format, it comprises 4 information packets, namely, the information packets IP2 to IP5 inclusive. The bits 25 and 26 indicate whether copying of the information is allowed. The bits 27 to 31 indicate the function mode. This means:

a) the channel mode, which indicates the type of wide-band signal (as stated hereinbefore this may be a stereo audio signal, a mono audio signal, or an audio signal comprising two different signal components for example, representing the same text but in two different languages). FIG. 8 shows how the signal components are divided between the two channels (channel I and channel II) in different channel modes;

b) the sample frequency $F_S$ of the wide-band signal; and c) the emphasis which may be applied to the wide-band digital signal in the transmitter. The values 50 and 15 μs are the time constants of the emphasis and CCITT J. The value 17 indicates a specific emphasis standard as defined by the CCITT (Comité Consultative Internationale de Télégraphie et Téléphonie).

The content of the frame portion FD2 in FIG. 2 will be described in more detail with reference to FIGS. 9, 10 and 11. In the A format, the second frame portion contains eight information packets. This is based on the assumptions that the wide-band digital signal $S_{BB}$ is converted into 32 sub-band signals (for every signal portion of the digital signal $S_{BB}$), and that an allocation word having a length of four bits is assigned to every sub-band. This yields a total of 64 allocation words having a length of 4 bits each, which can be accommodated exactly in eight information packets. In the B format, the second frame portion accommodates the allocation information for only half the number of sub-bands, so that now the second frame portion comprises only 4 information packets.

FIG. 9 lists a set of meanings of the four-bit allocation words AW. An allocation word associated with a specific sub-band specifies the number of bits by which the samples of the sub-band signal in the relevant sub-band are represented after quantization in the unit 9. For example, the allocation word AW, which is 0100, indicates that the samples are represented by 5-bit words. Moreover, it follows from FIG. 9 that the allocation word 0000 indicates that no samples have been generated in the relevant sub-band. This may happen, for example, if the sub-band signal in an adjacent sub-band has such a large amplitude that this signal fully masks the sub-band signal in the relevant sub-band. The allocation word 1111 is not used because it closely resembles the sync word in the first information packet IP1.

FIG. 10 indicates the sequence, in the case that the frame format is A, in which the allocation words AW j,m associated with the two channels j, where j=I or II, and the 32 sub-bands of the sequence number m, m ranging from 1 to 32, are arranged in the second frame portion. The allocation word AW I,1, belonging to the first sub-band signal component of the first and lowest sub-band (channel I, sub-band 1), is inserted first. After this, the allocation word AW II,1, belonging to the second sub-band signal component of the first and lowest sub-band (channel II, sub-band 1), is inserted in the second frame portion FD2. Subsequently, the allocation word AW I,2, belonging to the first sub-band signal component of the second and lowest but one sub-band (channel I, sub-band 2), is inserted in the frame portion FD2. This is followed by the allocation word AW II,2, belonging to the second sub-band signal component of the second sub-band (channel II, sub-band 2). This sequence continues until the allocation word AW II,4, belonging to the second sub-band signal component of the fourth sub-band (channel II, sub-band 4), is inserted in the second frame portion FD2. The second information packet IP2 (slot 2) of the frame, which is the first information packet in the frame portion FD2 of the frame, is then filled exactly. Subsequently, the information packet IP3 (slot 3) is filled with AW I,5; AW II,5; . . . AW II,8. This continues in the sequence as illustrated in FIG. 10, which merely gives the indices j-m of the inserted allocation word AW j, m.

FIG. 11 indicates the sequence for the allocation words in the case of a B-format frame. In this case, only allocation words of the sub-bands 1 to 16 are inserted. The sequence, similar to that illustrated in FIG. 10, corresponds to the sequence in which the separate samples belonging to a channel j and a sub-band m are applied to a synthesis filter upon reception in the receiver. This will be explained in greater detail hereinafter.

The serial data stream contains, for example, only frames in conformity with the A format. In the receiver, the allocation information in each frame is then employed for correctly deriving the samples from the information in the third frame portion of said frame. The serial data stream may also comprise, more or less alternately, both frames in conformity with the A format and frames in conformity with the B format. However, the frames in conformity with both formats may contain samples for all channels and all sub-bands in the third frame portion. A frame in conformity with the B format then lacks, in fact, the allocation information required to derive the samples for the channels I or II of the sub-bands 17 to 32 from the third frame portion of a B format frame.

The receiver comprises a memory in which the allocation information included in the second frame portion of an A format frame can be stored. If the next frame is a B format frame, only the allocation information for the sub-bands 1 to 16 and the channels I and II in the memory is replaced by the allocation information included in the second frame portion of the B format frame. The samples for the sub-bands 17 to 32 from the third frame portion of the B format frame are derived from the allocation information for these sub-bands derived from the preceding A format frame and still present in the memory. The reason for the alternate use of A format frames and B format frames is that for some sub-bands, the allocation information (in the present case, the allocation information for the higher sub-bands 17 to 32) does not change rapidly. Since, during quantization, the allocation information for the various sub-bands is available in the transmitter, this transmitter can decide to generate a B format frame instead of an A format frame if the allocation information for the sub-bands 17 to 32 inclusive does not change (significantly). Moreover, this illustrates that now additional space becomes available for the inclusion of samples in the third frame portion FD3.

For a specific value of P', the third frame portion of a B format frame is four information packets longer than the third frame portion of an A format frame. This enables the number of bits by which the samples in the lower sub-bands 1 to 16 are represented, to be increased, so that for these sub-bands, a higher transmission accuracy can be achieved. Moreover, if it is required to quantize the lower sub-bands more accurately, the transmitter can automatically opt for the generation of B format frames. This may then be at the expense of the accuracy with which the higher sub-bands are quantized.

The third frame portion FD3 in FIG. 2 contains the samples of the quantized sub-band signal components for the two channels. If the allocation word 0000 is not present in the frame portion FD2 for any of the sub-band channels, this means that, in the present example, twelve samples are inserted in the third frame portion FD3 for each of the 32 sub-bands and 2 channels. Thus, there are 768 samples in total.

Scale Factors

In the transmitter, the samples may be multiplied by a scale factor prior to their quantization. For each of the sub-bands and channels, the amplitudes of the twelve samples are divided by the amplitude of that sample of the twelve samples which has the largest amplitude. In that case, a scale factor should be transmitted for every sub-band and every channel in order to enable the inverse operation to be performed upon the samples at the receiving end. For this purpose, the third frame portion then contains scale factors SF j,m, one for each of the quantized sub-band signal components in the various sub-bands.

In the present example, scale factors are represented by 6-bit numbers, the most significant bit first, the values ranging from 000000 to 111110. The scale factors of the sub-bands to which these are allocated, i.e., whose allocation information is non-zero, are accommodated in the leading part of the frame portion FD3 before the samples. This means that the scale factors are transmitted before the transmission of the samples begins. This placement of the scale factor information enables rapid decoding in the receiver 5 to be achieved without the necessity of storing all the samples in the receiver, as will become apparent hereinafter. A scale factor SF j,m can thus represent the value by which the samples of the signal in the j-th channel of the m-th sub-band have been multiplied. Conversely, the number one divided by this value may be stored as the scale factor so that, at the receiving end, it is not necessary to divide the scale factors before the samples are scaled up to the correct values.

For the frame format A, the maximum number of scale factors is 64. If the allocation word AW j,m for a specific channel j and a specific sub-band m has the value 0000, which means that for this channel and this sub-band, no samples are present in the frame portion FD3, it will not be necessary to include a scale factor for this channel and this sub-band. The number of scale factors is then smaller than 64. The sequence in which the scale factors SF j,m are inserted in the third frame portion FD3 is the same as that in which the allocation words have been inserted in the second frame portion. The sequence is therefore as follows: SF I,1; SF II,1; SF I,2; SF II,2; SF I,3; SF II,3; . . . ; SF I,32; SF II,32.

If it is not necessary to insert a scale factor, the sequence will not be complete. The sequence may then be, for example: . . . SF I,4; SF I,5; SF II,5; SF II,6; . . . . In this case, the scale factors for the fourth sub-band of channel II and the sixth sub-band of channel I are not inserted. If the frame is a B format frame, it may still be considered to insert scale factors in the third frame portion for all the sub-bands and all the channels. However, this is not the only option. In this case, it would also be possible to insert scale factors in the third frame portion of the frame for the sub-bands 1 to 16 only. In the receiver, this requires a memory in which all scale factors can be stored at the instant at which a previously arriving A format frame is received. Subsequently, upon reception of the B format frame, only the scale factors for the sub-bands 1 to 16 are replaced by the scale factors included in the B format frame. The scale factors of the previously received A format frame for the sub-bands 17 to 32, are then used in order to restore the samples for these sub-bands included in the third frame portion of the B format frame to the correct scale.

The samples are inserted in the third frame portion FD3 in the same sequence as the allocation words and the scale factors, one sample for every sub-band of every channel in succession. According to this sequence, first, all the first samples for the quantized sub-band signals for all the sub-bands of both channels are inserted, then, all the second samples, . . . , etc. The binary representation of the samples is arbitrary, the binary word comprising only "ones" preferably not being used again.

The transmission signal generated by the transmitter 1 is subsequently supplied to the transmission medium 4 by the output 7, and, by means of the transmission medium 4, this signal is transferred to the receiver 5. Transmission through the transmission medium 4 may be a wireless transmission, such as, for example, a radio transmission channel. Many other transmission media are also possible, for example, a physical medium, such as a computer-readable storage medium. In this respect, optical transmission may be envisaged, for example, over optical fibers (real time) or optical record carriers (delayed time), such as Compact-Disc-like media, or transmission by means of magnetic record carriers utilizing RDAT or SDAT-like recording and reproducing technologies, for which reference is made to the book "The art of digital audio" by J. Watkinson, Focal Press, London 1988, these optical record carriers and magnetic record carriers being examples of a computer-readable storage medium.

The Receiver

As shown in FIG. 4, the receiver 5 comprises a decoder, which decodes the signal encoded in the coder 6 of the transmitter 1 and converts it into a replica of the wide-band digital signal supplied to the output 8. The essential information in the incoming signal is contained in the scale factors and the samples. The remainder of the information in the transmission signal is merely required for a "correct bookkeeping", to allow correct decoding. The receiver first derives the synchronizing and system information from the frames. The decoding process is then repeated for every incoming frame.

FIG. 12 shows a more detailed version of the receiver 5 of FIG. 4. The coded signal (the transmission signal) is applied through the terminal 10 to a switch 11, a switch 15 and a synchronization and clock unit 19. For every frame, the synchronization and clock unit 19 first detects the sync words situated in the first 16 bits of the first frame portion. Since the sync words of successive frames are, each time, spaced apart by an integral multiple of P' or P'+1 information packets, the sync words can be detected very accurately. Once the receiver is in synchronism, the sync word can be detected in the synchronization and clock unit 19. To accomplish this, a time window having, for example, a length of one information packet, is opened after each occurrence of P' information packets, so that only that part of the incoming information is applied to the sync word detector in the synchronization and clock unit 19. If the sync word is not detected, the time window remains open for the duration of another information packet, because the preceding frame may be a frame comprising P'+1 information packets. From these sync words, a PLL in the synchronization and clock unit 19 can derive a clock signal to control the central processing unit 18.

It is evident from the above that the receiver should know how many information packets are contained in one frame. For this purpose, at the beginning of the frame, the switch 15 is in the upper position shown, to apply the system information to the processing unit 18. The system information can now be stored in a memory 18a of the processing unit 18. The information relating to the number of information packets in a frame can be applied to the synchronization and clock unit 19 over a control-signal line 20, to open the time window at the correct instants for sync-word detection. When the system information is received, the switch 15 is changed over to the lower position. The allocation information in the second frame portion of the frame can now be stored in the memory 18b.

If the allocation information in the incoming frame does not comprise an allocation word for all the sub-bands and channels, this will have become apparent already from the detected system information. This may be, for example, the information indicating whether the frame is an A-format or a B-format frame. Thus, under the influence of the relevant information contained in the system information, the processing unit 18 will store the received allocation words at the correct location in the allocation memory 18b.

It is obvious that in the present example, the allocation memory 18b comprises 64 storage positions. If no scale factors are transmitted, the elements bearing the reference numerals 11, 12 and 17 may be dispensed with, and the content of the third frame portion of a frame is applied directly by a connection (not shown) from the input 10 to a synthesis filter 21. The samples are applied to the filter 21 in the same sequence as the order in which the filter 21 processes the samples in order to reconstruct the wide-band signal. The allocation information stored in the memory 18b is required in order to divide the serial data stream of samples into individual samples in the synthesis filter 21, each sample having the correct number of bits. For this purpose, the allocation information is applied to the filter 21 over the line 22.

The receiver further comprises a de-emphasis unit 23 which subjects the reconstructed digital signal supplied by the synthesis filter 21 to de-emphasis. For a correct de-emphasis, the relevant information in the bits 24 to 31 of the first frame portion should be applied from the memory 18a to the de-emphasis unit 23 over the line 24.

If the system uses scale factors in this format, the receiver will include the switch 11, the memory 12, and the multiplier 17, and the third frame portion will contain the scale factors SF j,m. Because of a control signal applied by the processing unit 18 over the line 13, the switch 11 is in the lower position at the instant at which the third frame portion FD3 of a frame arrives. Address signals are supplied to the memory 12 by the processing unit 18 over the line 14. The scale factors are then stored in the memory 12, which has 64 locations for the storage of the 64 scale factors. If a B-format frame is being received, the processing unit 18 applies such address signals to the memory 12 that only the scale factors for the sub-bands 1 to 16 are overwritten by the scale factors in the B-format frame.

Subsequently, as a result of another control signal applied over the line 13, the switch 11 is changed to the upper position shown in the drawing, so that the samples are applied to the multiplier 17. Using the allocation information, which is now applied to the multiplier 17 over the line 22, the multiplier 17 first derives the individual samples of the correct bit length from the serial data stream applied over the line 16. The samples are then multiplied so as to restore them to the correct values which the original samples had prior to scaling down in the transmitter. If the scale factors stored in the memory 12 are the scale factor values by which the samples have been scaled down in the transmitter, these values should first be inverted (one divided by the value) before application to the multiplier 17. Obviously, it is also possible to invert the scale factors upon reception before they are stored in the memory 12. If the scale factors in the frames are already equal to the value by which the samples should be scaled up during reception, they can be stored directly in the memory 12, and can then be applied directly to the multiplier 17.

It is evident that no memory is required to store all these samples before starting the signal processing performed upon the samples contained in the frame. At the instant at which a sample arrives over the line 16, all the information required for processing this sample is already available, so that processing can be carried out immediately. This entire process is controlled and synchronized by control signals and clock signals applied to all the parts of the transmitter by the processing unit 18.

Not all the control signals are shown. This is not necessary because the details of operation of the receiver will be obvious to those skilled in the art. Under control of the processing unit 18, the multiplier 17 multiplies the samples by the appropriate multiplication factors. The samples, which have now been restored to the correct amplitude, are applied to the reconstruction filter 21 in which the sub-band signals are reconverted to form the wide-band digital signal. Further description of the receiver is not necessary because such receivers are generally known, for example, as described in the Thiele et al. article cited above. Moreover, it will be evident that if the system information is also transmitted, the receiver can be highly flexible and can correctly decode the signals even if the transmission signals contain different system information.

Other Embodiments

FIG. 13 shows, diagrammatically, another embodiment of the transmitter, in the form of a recording device for recording the wide-band digital signal on a record carrier, such as a magnetic record carrier 25. The encoder 6 supplies the transmission signal to a recording device 27 comprising a write head 26, by means of which the signal is recorded in a track on the record carrier. It is then possible to record the transmission signal in a single track on the record carrier, for example, by means of a helical-scan recorder. In this case, the single track can be divided into juxtaposed tracks which are inclined relative to the longitudinal direction of the record carrier. An example of this is an RDAT-like recording method. Another method is to split the information and simultaneously record the split information in a plurality of juxtaposed tracks which extend on the record carrier in the longitudinal direction of the record carrier. For this, the use of an SDAT-like recording method may be considered. A comprehensive description of the two above methods can be found in the aforementioned book "The art of a digital audio" by J. Watkinson.

Again, it is to be noted that the signal supplied by the unit 6 may be first be encoded in a signal converter. This encoding may, for example, be an 8-to-10 conversion followed by an interleaving process, as described with reference to FIG. 4. If the transmission signal is recorded on the record carrier in a plurality of adjacent parallel track, the signal converter should also be capable of assigning the encoded information to the various tracks.

FIG. 14 shows, diagrammatically, an embodiment of the receiver 5, which may be used in conjunction with the transmitter of FIG. 13; the two may form one apparatus which then provides transmission over a period of time instead of distance. The receiver shown is a player or read device for reading a record carrier 25 according to the invention, on which the wide-band digital signal in the form of the transmission signal described above has been recorded by means of the device shown in FIG. 13. The transmission signal is read from a track on the record carrier by the read head 29 and is applied to the receiver 5, which may be, for example, of a construction as shown in FIG. 12. Again, the read device 28 may be constructed to carry out an RDAT-like or an SDAT-like reproducing method. Both methods are described comprehensively in the aforementioned book by Watkinson.

If the signal supplied by the unit 6 in the recording device shown in FIG. 13 has been converted, for example, in an 8-to-10 conversion and in an interleaving step, the transmission signal read from the record carrier 25 should first be de-interleaved and should be subjected to 10-to-8 conversion. Moreover, if the transmission signal has been recorded in a plurality of parallel tracks, the reproducing unit shown in FIG. 14 should arrange the information read from these tracks in the correct sequence before further processing is applied.

FIGS. 15*a*-15*d* show a number of other possibilities of inserting the scale factors and the samples in the third frame portion FD3 of a frame. FIG. 15*a* illustrates the above-described method in which the scale factors SF for all the sub-bands m and channels (I or II) are inserted in the third frame portion before the samples. FIG. 15*b* illustrates the same situation as FIG. 15*a*, but in this case, it diagrammatically represents the storage capacity for the scale factors SF I,m and SF II,m and the associated x samples for these two channels in the sub-band m. FIG. 15*b* shows the samples for the two channels in the sub-band m combined to blocks, whereas normally they are distributed within the third frame portion. The samples have a length of y bits. In the above example, x is 12 and y is now taken to be 8.

Stereo Coding

FIG. 15*c* shows another format. The two scale factors for the first and the second channel in the sub-band are still present in the third frame portion. However, instead of the x samples for both channels (the left and right channels for a stereo signal) in the sub-band m (i.e., 2x samples in total), only x samples for the sub-band m are included in the third frame portion. These x samples are obtained, for example, by adding corresponding samples in each of the two channels to one another. Thus, a monophonic signal is generated and transmitted for this sub-band m.

The x samples in FIG. 15c each have a length of z bits. If z is equal to y, this saves room in the third frame portion, which can be used for samples requiring a more accurate quantization. It is alternatively possible to express the x samples of the mono signal in Z=2y (=16) bits. Such a signal processing is applied if the phase difference between the left-hand and the right-hand signal components in a sub-band is irrelevant, but the waveform of the monophonic signal is important. This applies in particular to signals in higher sub-bands because the phase-sensitivity of the ear for the frequency in these sub-bands is smaller. By expressing the x samples of the mono signal in 16 bits, the waveform is quantized more accurately, while the room occupied by these samples in the third frame portion is equal to that in the example illustrated in FIG. 15b.

Yet another possibility is to represent the samples by an intermediate number of bits, for example, 12 bits. The signal definition is then more accurate than in the example illustrated in FIG. 15b, while, at the same time, room is saved in the third frame portion so that the bits saved can be allocated where the need is greater.

When the signals included in the third frame portion as illustrated in FIG. 15c are reproduced at the receiving end, a stereo effect is obtained which is referred to as "intensity stereo". Here, only the intensities of the left-channel and the right-channel signals (in the sub-band m) can differ because of a different value for the scale factors SF I,m and SF II,m. Thus, different kinds of information relating to the stereo nature of the audio signal can be represented by the composite signals and other signals which are transmitted.

FIG. 15d shows still another possibility. In this case, there is only one scale factor SFm for both signal components in the sub-band m. This is a situation which is particularly apt to occur in low-frequency sub-bands.

Yet another possibility, which is not shown, is that the x samples for the channels I and II of the sub-band m, as in FIG. 15b, do not have associated scale factors SF I,m and SF II,m. Consequently, these scale factors are not inserted in the same third frame portion. In this case, the scale factors SF I,m and SF II,m included in the third frame portion of a preceding frame, must be used for scaling up the samples in the receiver.

All the possibilities described with reference to FIGS. 15a-15d can be employed in the transmitter in order to achieve a most efficient data transfer over the transmission medium. Thus, frames as described with reference to different ones of FIGS. 15a-15d, may occur alternately in the data stream. It will be appreciated that, if the receiver is to be capable of correctly decoding these different frames, information about the structure of these frames must be included somewhere, such as in the system information.

The Transmitter

FIG. 16 shows the transmitter in more detail, particularly with respect to combination of the various items of information to form the serial data stream shown in FIGS. 1, 2 and 3. FIG. 16 in fact shows a more detailed version of the encoder 6 in the transmitter 1. The encoder 6 has a central processing unit 30 which controls a number of the encoder circuits, and also includes a generator 31 for generating the synchronizing information and the system information described with reference to FIG. 3, a generator 32 for supplying allocation information, a generator 33 (optional) for supplying the scale factors, a generator 34 for supplying the samples for a frame, and a generator 35 for generating the additional information packet IP P'+1.

The outputs of these generators are coupled to associated inputs of a multiplexer 40, shown as a five-position switch, whose output is coupled to the output 7 of the encoder 6. The CPU 30 controls the multiplexer (or switch) 40 over the line 53, and the various generators over the lines 41.1 to 41.4.

The operation of the transmitter will be described for a mono signal divided into M sub-band signals. These M sub-band signals $S_{SB1}$ to $S_{SBM}$ are applied to the encoder input terminals 45.1, 45.2, ..., 45.M. If scale factors are to be used, blocks of samples of each of the sub-band signals are processed together in the optional sub-band scaling units 46.1 to 46.M. A number, for example, twelve, of samples in a block are scaled to the amplitude of the largest sample in the block. The M scale factors are supplied to the unit 33 (if present) over the lines 47.1 to 47.M. The sub-band signals are supplied both to an allocation control unit 49 and (scaled if that option is in use) to M quantizers 48.1 to 48.M. For every sub-band, the allocation control unit 49 defines the number of bits with which the relevant sub-band signal should be quantized. This allocation information is applied to the respective quantizers 48.1 to 48.M over the lines 50.1 to 50.M, so that these quantizers correctly quantize the 12 samples of each of the sub-band signals, and is also supplied to the generator 32. The quantized samples of the sub-band signals are supplied to the generator 34 over the lines 51.1 to 51.M. The generators 32, 33 and 34 arrange the allocation information, the scale factors and the samples in the correct sequence described above.

In the position of the multiplexer (or switch) 40 shown, the synchronizing and system information associated with the frame to be generated, is supplied by the generator 31 in the CPU 30 and fed to the encoder output 7. Subsequently, the multiplexer (or switch) 40 responds to a control signal supplied by the CPU 30 over the line 53, and is set to the second position from the top so that the output of the generator 32 is coupled to the output 7. The sequence of allocation information is as described with reference to FIG. 10 or 11. After this, the switch 40 is set to the third position from the top, coupling the output of the generator 33 to the output 7, and the generator 33 now supplies the scale factors in the correct sequence. The switch 40 is then set to the next position, so that the output of the generator 34 is coupled to the output 7, and the generator 34 supplies the samples in the various sub-bands in the correct sequence. In this cycle, exactly one frame is applied to the output 7. Subsequently, the switch 40 is reset to the top position. A new cycle is then started, in which a subsequent block of 12 samples for each sub-band is encoded, and a subsequent frame can be generated on the output 7.

In some cases, for example, if the sample frequency $F_S$ is 44.1 kHz (see FIG. 5), an additional information packet (the dummy slot, see FIG. 2) must be added. In that case, after the generator 34 has finished supplying the samples, the multiplexer (or switch) 40 will be set to the bottom position. The output of the generator 35 is now coupled to the output 7, and the generator 35 generates the additional information packet IP P'+1. After this, the switch 40 is reset to the top position to start the next cycle.

It will be clear that, if the signal received by the transmitter is to be corrected for errors caused during transmission of the signal, an appropriate error coding and/or interleaving should be applied to the transmission signal. In addition, prior to transmission, some modulation (or channel encoding) is usually required. Thus, a transmission signal transmitted through the transmission medium may not be directly identifiable as the transmission signal, but will be a signal which has been derived therefrom.

It will be noted that, for example, in the case that the sub-bands have different widths, the numbers of samples for the various sub-bands inserted in one third frame portion may differ, and are likely to differ. If it is assumed, for example, that a division into three sub-bands is used, including a lower sub-band $SB_1$, a central sub-band $SB_2$ and an upper sub-band $SB_3$, the upper sub-band may have a bandwidth which is, for example, twice as large as that of the other two sub-bands. This means that the number of samples inserted in the third frame portion for the sub-band $SB_3$ is probably also twice as large as for each of the other sub-bands.

The sequence in which the samples are applied to the reconstruction filter in the decoder may then be: the first sample of $SB_1$, the first sample of $SB_3$, the first sample of $SB_2$, the second sample of $SB_3$, the second sample of $SB_1$, the third sample of $SB_3$, the second sample of $SB_2$, the fourth sample of $SB_3$, . . . , etc. The sequence in which the allocation information for these sub-bands is then inserted in the second frame portion will then be: first, the allocation word for $SB_1$, then, the allocation word of $SB_3$, and subsequently, the allocation word for $SB_2$. The same applies to the scale factors. Moreover, the receiver can derive, from the transmitted system information, that, in this case, the cycle comprises groups of four samples each, each group comprising one sample of $SB_1$, one sample of $SB_3$, one sample of $SB_2$ and subsequently, another sample of $SB_3$.

Other Frame Arrangements

Figures 17, 18:
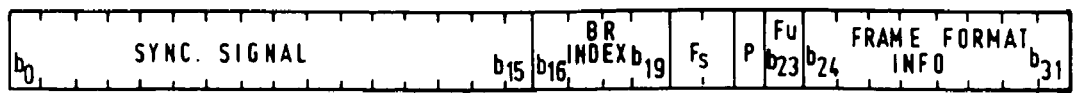
FIG. 17 is a diagram of another structure for the first portion of a frame.
FIG. 18 is a table showing system information included in the structure of FIG. 17.

FIG. 17 shows another structure of the first frame portion FD1. Again, the first frame portion FD1 contains exactly 32 bits and, therefore, corresponds to one information packet. The first 16 bits again constitute the synchronizing signal (or synchronization word). The synchronization word may also be the same as the synchronization word of the first frame portion FD1 in FIG. 3, but the FIG. 17 information accommodated in bits 16 through 31 differs from the information in bits 16 through 31 in FIG. 3. The bits $b_{16}$ through $b_{19}$ represent a 4-bit bit rate index (BR index) number whose meaning is illustrated in the table in FIG. 18. If the bit rate index is equal to the 4-bit digital number '0000', this denotes the free-format condition, which means that the bit rate is not specified and that the decoder has to depend upon the synchronization word alone to detect the beginning of a new frame. The 4-bit digital number '1111' is not employed in order not to disturb the synchronization word detection. In the second column of the table of FIG. 18, the bit rate index is represented as a decimal number corresponding to the 4-bit digital number. The corresponding bit rate values are given in column 1.

With this format, the first frame portion contains information related to the number of information packets in the frame. As shown in FIG. 18, the sample frequency $F_S$ is defined by one of the four possible 2-bit digital numbers for the bits $b_{20}$ and $b_{21}$ having the values listed. Bit 22 indicates whether the frame comprises a dummy slot, in which case $b_{22}$='1', or does not comprise a dummy slot, in which case $b_{22}$='0'. Along with other predetermined information, then, the information in the bits $b_{16}$ through $b_{22}$ makes it possible to determine how many information packets are actually present in the frame.

From the number of samples of the wide-band signal whose corresponding information belonging to the transmission signal is accommodated in one frame, in the present example, $n_S$=384, it is possible to determine how many information packets B are present in the frame by means of the data in the table in FIG. 8, the padding bit $b_{22}$ and the formula $$P=(BR \times n_S)/(N \times F_S).$$

The bit $b_{23}$ is intended for specifying a future extension of the system. This future extension will be described hereinafter. For the time being, this bit is assumed to be '0'.

Indicator Signals

Various indicator and control signals are provided by the bits $b_{24}$ through $b_{31}$, which will be described with reference to FIGS. 19 and 20. The bits $b_{24}$ and $b_{25}$ give the mode indication for the audio signal. For the four possibilities of this two-bit digital number, FIG. 20 shows whether the wide-band digital signal is a stereo audio signal ('00'), a mono signal ('11'), a bilingual signal ('10'), or an intensity stereo audio signal ('01'). In the last-mentioned case, the bits 26 and 27 indicate which sub-bands have been processed in accordance with the intensity stereo method. In this example, the respective two-bit numbers '00', '01', '10', and '11' mean, respectively, that the sub-bands 5-32, 9-32, 13-32 and 17-32 have been processed in accordance with the intensity stereo method. As stated hereinbefore, intensity stereo can be applied to the higher sub-bands because the ear is less phase-sensitive for the frequencies in these sub-bands.

The bit $b_{28}$ can be used as a copyright bit. If this bit is '1', this means that the information is copy-protected and should/cannot be copied. The bit $b_{29}$ can indicate that the information is original information ($b_{29}$='1'), for example, in the case of prerecorded tapes, or information which has been copied ($b_{29}$='0'). The bits $b_{30}$ and $b_{31}$ specify the emphasis which may have been applied to the wide-band signal in the transmitter, for example, as described with reference to FIG. 7.

Various configurations of the second frame portion FD2 may be described by the various mode indications represented by the bits $b_{24}$ through $b_{27}$ in the first frame portion. The second frame portion comprises the 4-bit allocation words whose meaning has been described with reference to FIG. 9. For the stereo mode ($b_{24}$, $b_{25}$=00) and the bilingual mode ($b_{24}$, $b_{25}$=10), the second frame portion FD2 again has a length of 8 information packets (slots) and is composed as described with reference to FIG. 10. In the stereo mode, 'I' in FIG. 10 then represents, for example, the left-channel component and 'II' represents the right channel component. For the bilingual mode, 'I' denotes one language and 'II' denotes the other language. For the mono mode ($b_{24}$, $b_{25}$=11), the length of the second frame portion FD2 is, of course, only 4 information packets (slots).

FIG. 21 illustrates the sequence of the allocation words for the various sub-bands 1 through 32 in the four information packets (slots) 2 through 5. Thus, every quantity M-i represents a four-bit allocation word which specifies the number of bits in every sample in the sub-band of the sequence number i, i ranging from 1 to 32. In the intensity stereo mode ($b_{24}$, $b_{25}$=01), there are four possibilities indicated by means of the bits $b_{26}$ and $b_{27}$, see FIG. 20. All of these possibilities result in a different content of the second frame portion FD2.

FIGS. 22*a*-22*d* illustrate the four different contents of the second frame portion. If the switch bits $b_{26}$, $b_{27}$ are '00', the signals in the sub-bands 1 through 4 are normal stereo signals and the signals in the sub-bands 5 through 32 are intensity-stereo signals. This means that for the sub-bands 1 through 4, for the left-hand and right-hand channel components in these sub-bands, the associated allocation words should be stored in the second frame portion. In FIG. 22*a*, this is represented by the consecutive allocation words AW (L, 1); AW (R, 1); AW (L, 2); AW (R, 2); . . . ; AW (R, 4), stored in the slot 2 of the frame, i.e., the first slot of the second frame portion. FIG. 22*a* only gives the indices (i-j) of the allocation words, i being equal to L or R and indicating the left-hand and the right-hand channel components, respectively, and j ranging from 1 through 4 and representing the sequence number of the sub-band. For the sub-bands 5 through 32, the left-hand and the right-hand channel components contain the same series of samples. The only difference resides in the scale factors for the left-hand and the right-hand channel components in a sub-band. Consequently, such a sub-band requires only one allocation word. The allocation words AW (i, j) for these sub-bands 5 through 32 are indicated by the indices M-j, where i is consequently equal to M for all the sub-bands and where j ranges from 5 through 32.

FIG. 22*a* shows that 4½ information packets are required for inserting the 36 allocation words in the second frame portion. If the switch bits $b_{26}$, $b_{27}$ are '01', the signals in the sub-bands 1 through 8 will be normal stereo signals and the signals in the sub-bands 9 through 32 will be intensity-stereo signals. This means that for each of the sub-bands 1 through 8, two allocation words AW(L, j) and AW(R, j) are required and that for each of the sub-bands 9 through 32, only one allocation word AW(M, j) is required. This implies that, in total, 40 allocation words are needed, included in five information packets (slots), i.e., IP2 through IP6, of the frame. This is illustrated in FIG. 22*b*. In this case, the second frame portion FD2 has a length of five information packets (slots).

If the switch bits $b_{26}$, $b_{27}$ are '10', the signals in the sub-bands 1 through 12 will be normal stereo signals and the signals in the sub-bands 13 through 32 will be intensity-stereo signals. FIG. 22*c* gives the structure of the second frame portion FD2 with the allocation words for the various sub-bands. The second frame portion now has a length of 5½ information packets (slots) in order to accommodate all the allocation words. If the switch bits $b_{26}$, $b_{27}$ are '11', the signals in the sub-bands 1 through 16 will be normal stereo signals and the signals in the sub-bands 17 through 32 will be intensity-stereo signals. Now, 48 allocation words are needed, which are inserted in the second frame portion, which then has a length of 6 information packets (slots), see FIG. 22*d*.

What has been stated above about the scale factors is also valid here. When it is assumed that an allocation word 0000 has been assigned neither to any of the sub-bands nor to any of the channels, 64 scale factors are required both for the stereo mode and for the intensity-stereo modes. This is because in all the intensity-stereo modes, every mono sub-band should have two scale factors to enable intensity-stereo to be realized for the left-hand and the right-hand channel in this sub-band (see FIG. 15*c*). It is obvious that in the mono mode, the number of scale factors is halved, i.e., 32, again assuming that the allocation word 0000 has not been assigned to any of the sub-bands.

Scale Factor Determination

Figure 24:
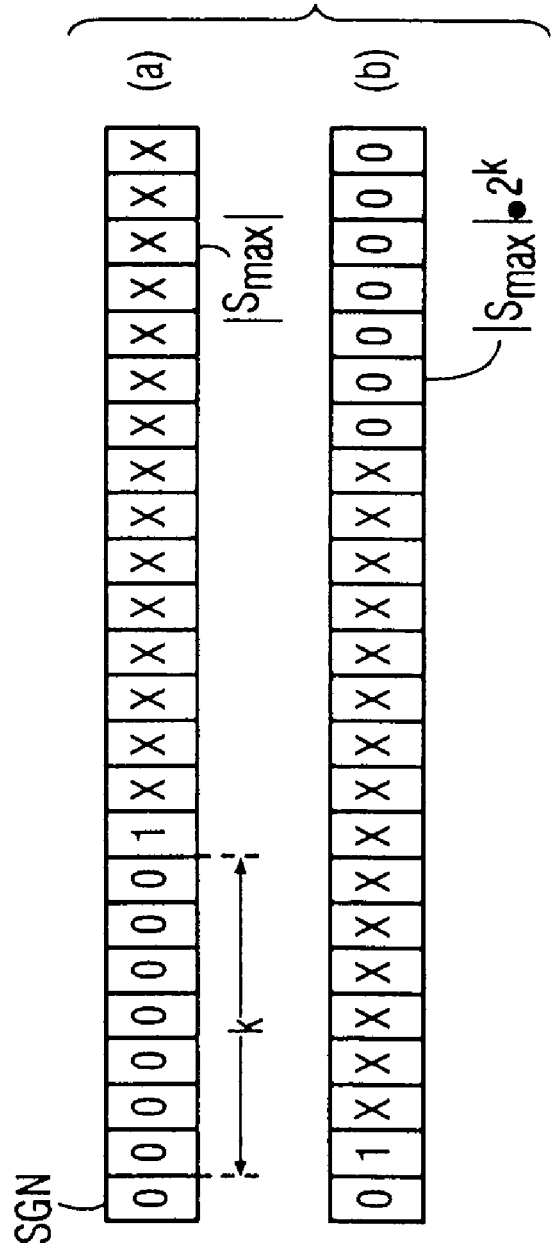
FIG. 24 is a binary number diagram relating the sample with largest absolute value to an intermediate value used for scale factor computations.

A method of determining the 6-bit scale factors will now be explained below. As stated hereinbefore, the sample having the largest absolute value is determined for every 12 samples of a sub-band channel. Line (a) of FIG. 24 shows the binary representation of a maximal sample $|S_{max}|$. The first bit, designated SGN, is the sign bit and is '0' because it relates to the absolute value of $S_{max}$. The samples are represented in two's complement notation. The sample comprises k 'zeros' followed by a "1". The values of the other bits of the 24-bit digital number are not relevant and can be either '0' or '1'.

$|S_{max}|$ is now multiplied by 2k to produce the number shown in line (b) of FIG. 24. Subsequently, $|S_{max}| \cdot 2^k$ is compared with a digital number $DV_1$ equal to 010100001100000000000000 and a digital number $DV_2$ equal to 011001100000000000000000. If $|S_{max}| \cdot 2^k < DV_1$, a specific constant p is taken to be 2. If $DV_1 \leq |S_{max}| \cdot 2^k < DV_2$, then p is taken to be 1. If $|S_{max}| \cdot 2^k \geq DV_2$, then p=0.

The number k is limited to $0 \leq k \leq 20$. The scale factor is now determined by the numbers k and p in accordance with the following formula:

$$SF = 3k + p.$$

Consequently, the maximum value for SF is 62. This means that the scale factors can be represented by 6-bit numbers, the six-bit number 111111 (which corresponds to the decimal number 63) not being used. In fact, the 6-bit binary numbers are not the scale factors, but they are in a uniquely defined relationship with the actual scale factors, as will be set forth below. All of the 12 samples S are now multiplied by a number which is related to the values for k and p. The 12 samples are each multiplied as follows:

$$S' = S \times 2^k \times g(p)$$

where the number g(p) has the following relation with p:

$$g(p) = 1 \text{ for } p = 0$$

$$g(p) = 1 + 2^{-2} + 2^{-8} + 2^{-10} + 2^{-16} + 2^{-18} + 2^{-23} \text{ for } p = 1$$

$$g(p) = 1 + 2^{-1} + 2^{-4} + 2^{-6} + 2^{-8} + 2^{-9} + 2^{-10} + 2^{-13} + 2^{-15} + 2^{-16} + 2^{-17} + 2^{-19} + 2^{-20} \text{ for } p = 2.$$

Figure 25:
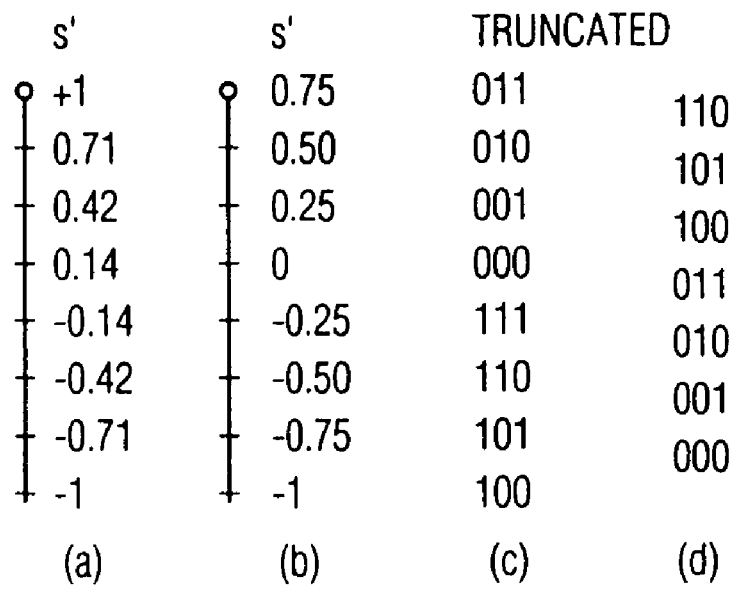
FIG. 25 is a table showing quantization of scaled samples to form q-bit digital representations.

The parameter k specifies the number of 6 dB steps and the factors g(1) and g(2) are the closest approximations to steps of 2 dB. The samples S' thus scaled are now quantized to enable them to be represented by q-bit digital numbers in two's complement notation. In FIG. 25, this is illustrated for q=3. The scaled samples S' have values between +1 and −1, see FIG. 25*a*. In the quantizer, these samples must be represented by q bits, q corresponding to the allocation value for the relevant sub-band (channel). Since, as stated above, the q-bit digital number comprising only 'ones' is not used to represent a sample, the total interval from −1 to +1 should be divided over $2^{q-1}$ smaller intervals. For this purpose, the scaled samples S' are transformed into the samples S" in accordance with the formula:

$$S'' = S'(1 - 2^{-q}) - 2^{-q}.$$

The samples S" are subsequently truncated at q bits, see FIG. 25*c*. Since the '111' representation is not permissible, the sign bits are inverted, see FIG. 25*d*. The q(=3)-bit numbers given in FIG. 25*d* are now inserted in the third frame portion FD3, see FIG. 2.

Samples S' which comply with $-0.71 \leq S' \leq -0.14$ are represented by the digital number '001'. This proceeds similarly for samples S' of larger values up to samples which comply with $0.71 \leq S' < 1$, and which are represented by the digital number '110'. Consequently, the digital number '111' is not used.

Figure 26:
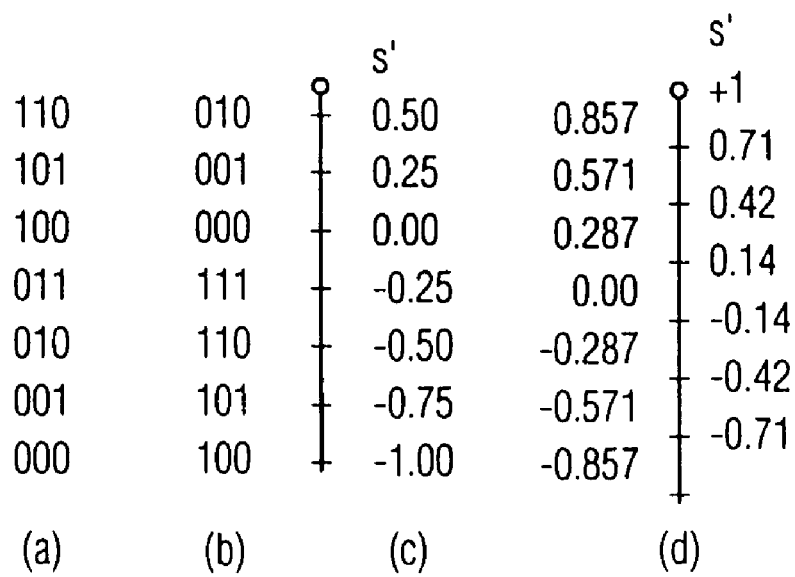
FIG. 26 is a table showing dequantization of the q-bit digital representations.

Dequantization at the receiving side is effected in a manner inverse to the quantization at the transmission side, see FIG. 26. This means that first, the sign bits of the q-bit digital numbers are inverted to obtain the normal two's complement notation, see FIG. 26*b*.

Subsequently, the samples S' are derived from the transformed samples S" by means of the formula:

$$S' = (S'' + 2^{-q+1})(1 + 2^{-q} + 2^{-2q} + 2^{-3q} + 2^{-4q} + \ldots)$$

(see FIGS. 26*c* and 26*d*). The values S' thus obtained are now situated exactly within the original intervals in FIG. 25*a*. At the receiving side, the samples S' are subsequently scaled to the original amplitudes by means of the transmitted information k, p which is related to the scale factors. Thus, at the receiving side, a number g'(p) complies with:

$g'(p)=1$ for p=0

$g'(p)=2^{-1}+2^{-2}+2^{-5}+2^{-6}$ for p=1

$g'(p)=2^{-1}+2^{-3}+2^{-8}+2^{-9}$ for p=2.

Scaling to the original amplitudes is now effected using the following formula:

$$S=S'\cdot 2^{-k}\cdot g(p).$$

In the two possible versions of a frame as described with reference to FIGS. 2 and 3 and FIGS. 2, 17 and 19, respectively, the third frame portion may not be filled entirely with information. This will occur more often and sooner as the algorithms for sub-band coding, i.e., the entire process of dividing the signal into sub-band signals and the subsequent quantization of the samples in the various sub-bands, are improved. In particular, this will enable the information to be transmitted with a smaller number of bits (average number per sample). The unused part of the third frame portion can then be utilized for transmitting additional information. In the first frame portion FD1 in FIG. 17, allowance has been made for this by means of the "future-use" bit $b_{23}$. Normally, this bit is '0', as will be apparent from FIG. 18.

Additional Signal

Figure 23:
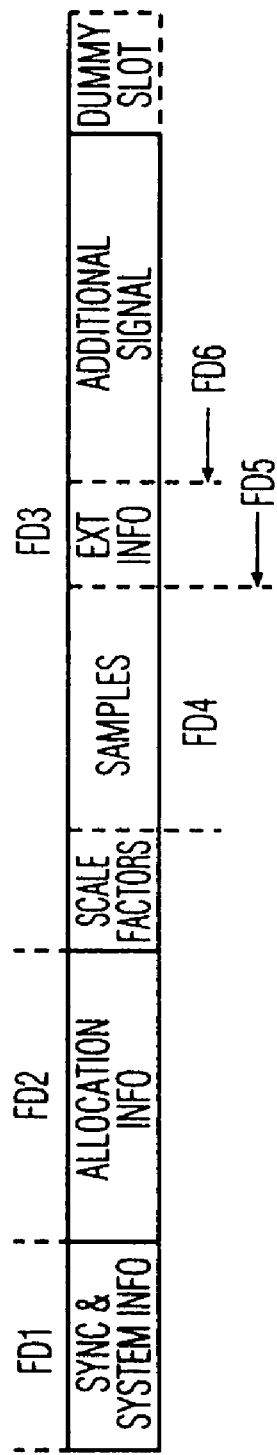
FIG. 23 is a diagram of a frame structure including an additional signal.

If an additional signal has been inserted in the third frame portion FD3 of a frame, the future-use bit $b_{23}$ in the first frame portion FD1, see FIG. 17, will be '1'. During reading of the first frame portion FD1, this makes it possible for the receiver to detect whether the frame contains additional information. The allocation information and the scale factors, see FIG. 23, inform the receiver that only the part of the third frame portion FD3, marked FD4 in FIG. 23, contains quantized samples of the sub-band signals. The remainder, marked FD5 in FIG. 23, now contains the additional information. The first bits in this frame portion FD5 are designated 'EXT INFO' or extension information. These bits indicate the type of additional information. The additional information may be, for example, an additional audio channel, for example, for the transmission of a second stereo channel. Another possibility is to use these two additional audio channels to realize 'surround sound' together with the audio sub-band signals in the frame portion FD4. In that case, the front-rear information required for surround sound may be included in the frame portion FD5. In the part marked FD6, the frame portion FD5 may again contain allocation information, scale factors and samples (in this order), and the sequence of the allocation words and the scale factors may then be similar to the sequence as described with reference to FIGS. 2 and 3 and FIGS. 2, 17 and 19.

In the case of 'surround sound', simple receivers may merely decode the stereo audio information in the frame portions FD2 and FD3, except for the frame portion FD5. More sophisticated receivers are then capable of reproducing the surround-sound information and, for this purpose, they also employ the information in the frame portion FD5.

The extension-info bits may also indicate that the information in the frame portion FD6 relates to text, for example, in the form of ASCII characters. It may even be considered to insert video or picture information in the frame portion FD6, this information again being characterized by the extension-info bits.

It is to be noted that the invention is not limited to the embodiments shown herein. The invention also relates to those embodiments which differ from the embodiments shown herein with respect to features which are not relevant to the invention as defined in the claims.

What is claimed is:

1. A computer-readable storage medium having an encoded wide-band digital audio signal recorded on it, the wide-band digital audio signal comprising at least a first and a second signal component, the at least first and second signal components being filtered into sub-signals for the at least first and second signal components, a sub-signal comprising sample information,
    the computer-readable storage medium having recorded thereon sub-signals of the at least first and second signal components that have not been processed into a composite sub-signal, and further, a mode indicator control signal, indicating whether a corresponding sub-signal of the at least first and second signal components have or have not been processed into a composite sub-signal, also being recorded on the computer-readable storage medium.

2. The computer-readable storage medium as claimed in claim 1, characterized in that further a sub-signal indicator control signal, indicating which at least one corresponding sub-signal of the at least first and second signal components have been processed, also is recorded on the computer-readable storage medium.

3. The computer-readable storage medium as claimed in claim 1, characterized in that, if the mode indicator control signal indicates that a corresponding sub-signal of the at least first and second signal components have been processed, the composite sub-signal obtained from processing said corresponding sub-signals of the at least first and second signal components also is recorded on the computer-readable storage medium.

4. The computer-readable storage medium as claimed in claim 1, wherein a sub-signal also comprises scale factor information in addition to the sample information,
    characterized in that, if the mode indicator control signal indicates that a corresponding sub-signal of the at least first and second signal components have been processed into a composite sub-signal, the composite sub-signal obtained from processing said corresponding sub-signals of the at least first and second signal components also is recorded on the computer-readable storage medium, as well as information representative of the respective scale factors of all the sub-signals of the at least first and second signal components.

5. The computer-readable storage medium as claimed in claim 1, characterized in that the mode indicator control signal is a 2-bit signal, where the bit combination '01' indicates that the corresponding sub-signal of the at least first and second signal components have been processed.

6. The computer-readable storage medium as claimed in claim 5, characterized in that the bit combination '00' indicates that no sub-signals have been processed into composite sub signals.

7. The computer-readable storage medium as claimed in claim 2, characterized in that the sub-signal indicator control signal indicates which $m_1$ corresponding sub-signals of the at least first and second signal components have been processed, where $m_1$ is larger than 1.

8. The computer-readable storage medium as claimed in claim 7, characterized in that $m_1$ can vary over time.

9. The computer-readable storage medium as claimed in claim 7, the $m_1$ sub-signals are the signals corresponding to the highest frequency bands in the frequency range of the wide-band digital audio signal.

10. The computer-readable storage medium as claimed in claim 9, characterized in that the sub-signal indicator control signal is a 2-bit signal.

11. The computer-readable storage medium as claimed in claim 10, characterized in that the bit combination '11' indicates a predetermined value for $m_1$, and the bit combination '10' indicates a value for $m_1$ which equals the value for $m_1$ with the bit combination '11' plus 4.

12. The computer-readable storage medium as claimed in claim 11, characterized in that the bit combination '01' indicates a value for $m_1$ which is the value for $m_1$ with the bit combination '11' plus 8.

13. The computer-readable storage medium as claimed in claim 12, characterized in that the bit combination '00' indicates a value for $m_1$ which is the value for $m_1$ with the bit combination '11' plus 12.

14. The computer-readable storage medium as claimed in claim 11, characterized in that the value for $m_1$ with the bit combination '11' is 16.

15. The computer-readable storage medium as claimed in claim 2, characterized in that, if the mode indicator control signal indicates that a corresponding sub-signal of the at least first and second signal components have been processed, the composite sub-signal obtained from processing said corresponding sub-signals of the at least first and second signal components also is recorded on the computer-readable storage medium.

16. The computer-readable storage medium as claimed in claim 2, wherein a sub-signal also comprises scale factor information in addition to the sample information, characterized in that, if the mode indicator control signal indicates that a corresponding sub-signal of the at least first and second signal components have been processed into a composite sub-signal, the composite sub-signal obtained from processing said corresponding sub-signals of the at least first and second signal components also is recorded on the computer-readable storage medium, as well as information representative of the respective scale factors of all the sub-signals of the at least first and second signal components.

17. The computer-readable storage medium as claimed in claim 9, the $m_1$ sub-signals are the signals corresponding to the highest frequency bands in the frequency range of the wide-band digital audio signal.

18. The computer-readable storage medium as claimed in claim 17, characterized in that the sub-signal indicator control signal is a 2-bit signal.

19. The computer-readable storage medium as claimed in claim 18, characterized in that the bit combination '11' indicates a predetermined value for $m_1$, and the bit combination '10' indicates a value for $m_1$ which equals the value for $m_1$ with the bit combination '11' plus 4.

20. The computer-readable storage medium as claimed in claim 19, characterized in that the bit combination '01' indicates a value for $m_1$ which is the value for $m_1$ with the bit combination '11' plus 8.

21. The computer-readable storage medium as claimed in claim 20, characterized in that the bit combination '00' indicates a value for $m_1$ which is the value for $m_1$ with the bit combination '11' plus 12.

22. The computer-readable storage medium as claimed in claim 19, characterized in that the value for $m_1$ with the bit combination '11' is 16.

\* \* \* \* \*